(12) United States Patent
Saeki et al.

(10) Patent No.: US 12,477,251 B2
(45) Date of Patent: Nov. 18, 2025

(54) IMAGING ELEMENT, SIGNAL PROCESSING METHOD FOR IMAGING ELEMENT, AND ELECTRONIC EQUIPMENT

(71) Applicant: Sony Semiconductor Solutions Corporation, Kanagawa (JP)

(72) Inventors: Takanori Saeki, Kanagawa (JP); Yoshinori Tanaka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 51 days.

(21) Appl. No.: 18/693,034

(22) PCT Filed: Sep. 14, 2022

(86) PCT No.: PCT/JP2022/034296
§ 371 (c)(1),
(2) Date: Mar. 18, 2024

(87) PCT Pub. No.: WO2023/063005
PCT Pub. Date: Apr. 20, 2023

(65) Prior Publication Data
US 2025/0133309 A1 Apr. 24, 2025

(30) Foreign Application Priority Data
Oct. 15, 2021 (JP) .................................. 2021-169843

(51) Int. Cl.
*H04N 25/78* (2023.01)
*H04N 25/616* (2023.01)
*H04N 25/767* (2023.01)

(52) U.S. Cl.
CPC .......... *H04N 25/78* (2023.01); *H04N 25/767* (2023.01); *H04N 25/616* (2023.01)

(58) Field of Classification Search
None
See application file for complete search history.

(56) References Cited

U.S. PATENT DOCUMENTS

2017/0237917 A1 8/2017 Sato
2019/0394417 A1 12/2019 Hisamatsu

FOREIGN PATENT DOCUMENTS

| WO | 2016136500 A1 | 9/2016 |
| WO | 2017183117 A1 | 10/2017 |
| WO | 2018123609 A1 | 7/2018 |

OTHER PUBLICATIONS

International Search Report (PCT/ISA/210), International Application No. PCT/JP2022/034296, dated Nov. 8, 2022.

*Primary Examiner* — Mark T Monk
(74) *Attorney, Agent, or Firm* — Michael Best & Friedrich LLP

(57) ABSTRACT

An imaging element with a pixel array that has pixels each including a photoelectric converting section and an analog-to-digital converting section. The analog-to-digital converting section includes a Gray code latch circuit configured to latch a Gray code corresponding to an analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between a binary code for the same bit resulting from code-conversion by the code converter and the predetermined binary code latched in the temporary latch. Data transfer between the Gray code latch circuit and the code converter is processed in parallel.

16 Claims, 26 Drawing Sheets

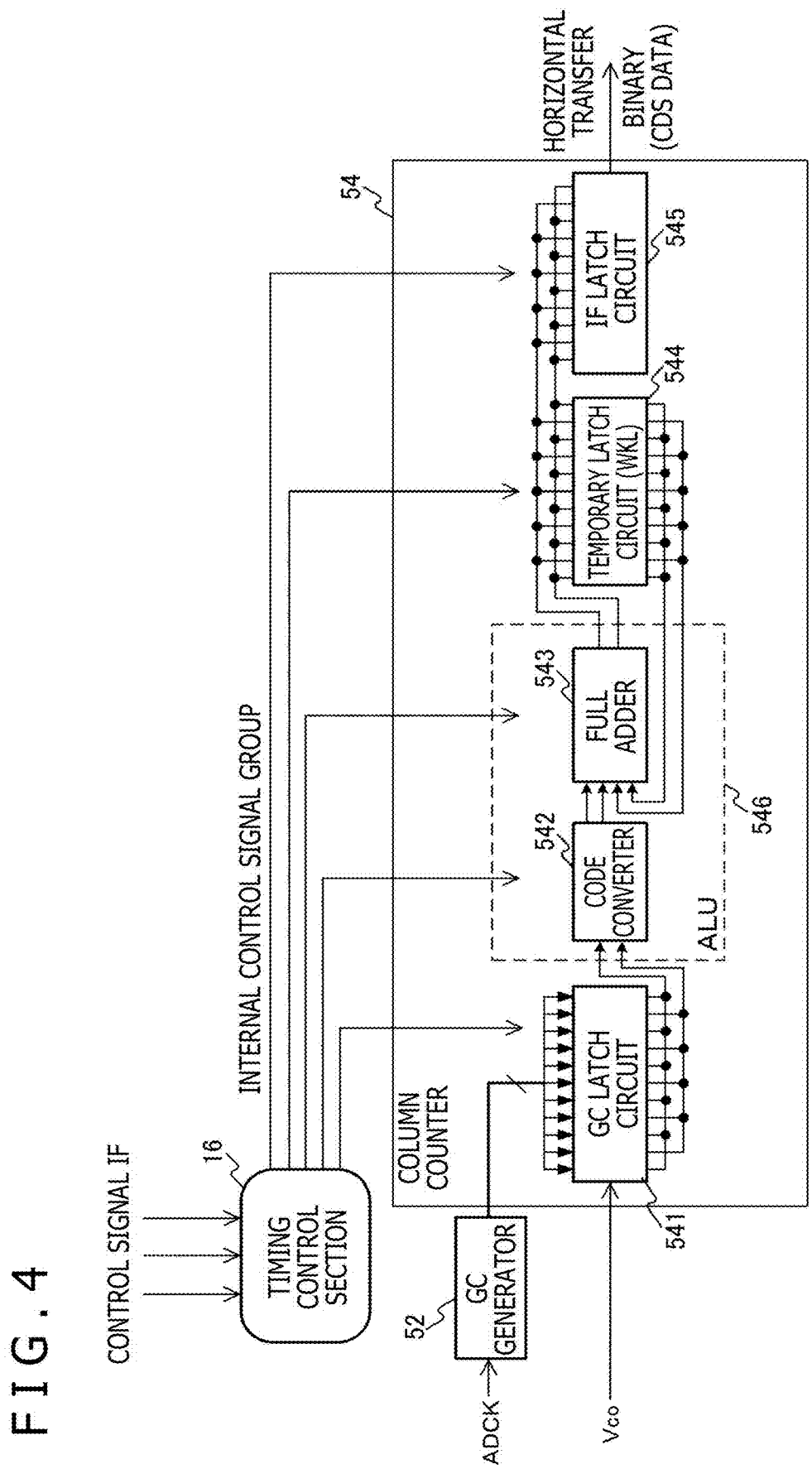

FIG. 5

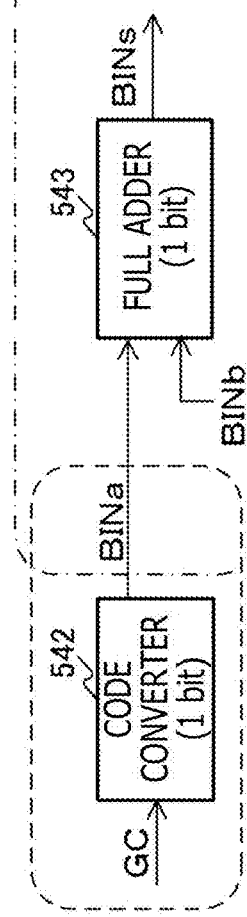

GC to BIN CONVERSION step1 : BINa[10]=GC[10]
step2 : BINa[9]=GC[9] xor BINa[10]
step3 : BINa[8]=GC[8] xor BINa[9]
step4 : BINa[7]=GC[7] xor BINa[8]
step5 : BINa[6]=GC[6] xor BINa[7]
step6 : BINa[5]=GC[5] xor BINa[6]
step7 : BINa[4]=GC[4] xor BINa[5]
step8 : BINa[3]=GC[3] xor BINa[4]
step9 : BINa[2]=GC[2] xor BINa[3]
step10: BINa[1]=GC[1] xor BINa[2]
step11: BINa[0]=GC[0] xor BINa[1]

SEQUENTIAL COMPUTING FROM HIGH-ORDER BITS

BIN CONVERSION step1 : (C[0],BINs[0])=BINa[0]+BINb[0]
step2 : (C[1],BINs[1])=BINa[1]+BINb[1]+C[0]
step3 : (C[2],BINs[2])=BINa[2]+BINb[2]+C[1]
step4 : (C[3],BINs[3])=BINa[3]+BINb[3]+C[2]
step5 : (C[4],BINs[4])=BINa[4]+BINb[4]+C[3]
step6 : (C[5],BINs[5])=BINa[5]+BINb[5]+C[4]
step7 : (C[6],BINs[6])=BINa[6]+BINb[6]+C[5]
step8 : (C[7],BINs[7])=BINa[7]+BINb[7]+C[6]
step9 : (C[8],BINs[8])=BINa[8]+BINb[8]+C[7]
step10: (C[9],BINs[9])=BINa[9]+BINb[9]+C[8]
step11: (BINs[11],BINs[10])=BINa[10]+BINb[10]+C[9]

SEQUENTIAL COMPUTING FROM LOW-ORDER BITS

FIG. 6

```
                    ┌ PREPROCESSING ┐         ┌ CONVERT ┐
                    (DERIVE BINa[0])           & ADD step1:   P[0]=GC[0] xor 0
step2:   P[1]=GC[1] xor P[0]
step3:   P[2]=GC[2] xor P[1]
step4:   P[3]=GC[3] xor P[2]
step5:   P[4]=GC[4] xor P[3]
step6:   P[5]=GC[5] xor P[4]
step7:   P[6]=GC[6] xor P[5]
step8:   P[7]=GC[7] xor P[6]
step9:   P[8]=GC[8] xor P[7]
step10:  P[9]=GC[9] xor P[8]
step11:  BINa[0]=GC[10] xor P[9]                (C[0],BINs[0])=BINa[0]+BINb[0]+0
step12:  BINa[1]=GC[1] xor BINa[0]              (C[1],BINs[1])=BINa[1]+BINb[1]+C[0]
step13:  BINa[2]=GC[2] xor BINa[1]              (C[2],BINs[2])=BINa[2]+BINb[2]+C[1]
step14:  BINa[3]=GC[3] xor BINa[2]              (C[3],BINs[3])=BINa[3]+BINb[3]+C[2]
step15:  BINa[4]=GC[4] xor BINa[3]              (C[4],BINs[4])=BINa[4]+BINb[4]+C[3]
step16:  BINa[5]=GC[5] xor BINa[4]              (C[5],BINs[5])=BINa[5]+BINb[5]+C[4]
step17:  BINa[6]=GC[6] xor BINa[5]              (C[6],BINs[6])=BINa[6]+BINb[6]+C[5]
step18:  BINa[7]=GC[7] xor BINa[6]              (C[7],BINs[7])=BINa[7]+BINb[7]+C[6]
step19:  BINa[8]=GC[8] xor BINa[7]              (C[8],BINs[8])=BINa[8]+BINb[8]+C[7]
step20:  BINa[9]=GC[9] xor BINa[8]              (C[9],BINs[9])=BINa[9]+BINb[9]+C[8]
step21:  BINa[10]=GC[10] xor BINa[9]            (BINs[11],BINs[10])=BINa[10]+BINb[10]+C[9]
```

FIG. 12
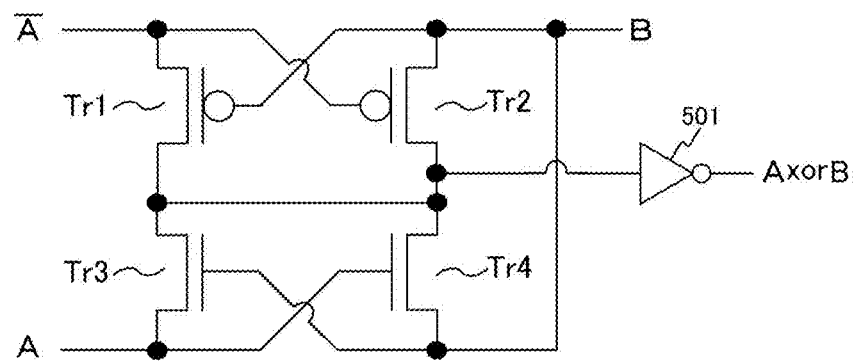
a
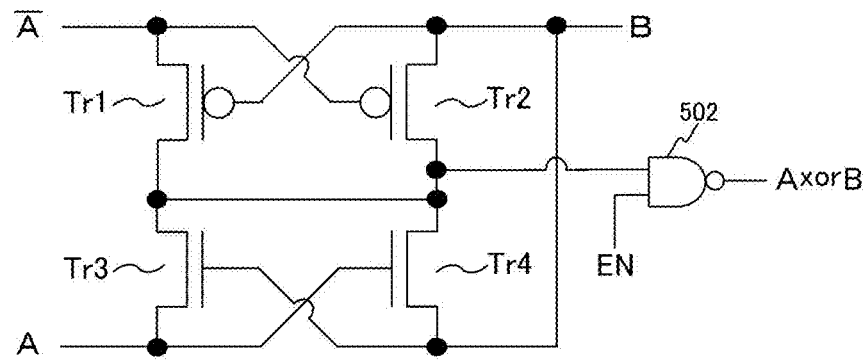
b

FIG. 23

| CIRCUIT CONFIGURATION | | KNOWN CONFIGURATION | | RDL IS ABOLISHED IN KNOWN CONFIGURATION | | EXAMPLE 2 | | EXAMPLE 3 | | EXAMPLE 4 | |
|---|---|---|---|---|---|---|---|---|---|---|---|
| CIRCUIT CONFIGURATION DETAILS | TRANSFER CONTROL | 2-BIT SERIAL | | 2-BIT SERIAL | | 2-BIT SERIAL | | 2-BIT SERIAL | | 2-BIT SERIAL | |
| | LATCH SIDE POWER SUPPLY | POWER SUPPLY FOR EXCLUSIVE USE | | POWER SUPPLY FOR EXCLUSIVE USE | | POWER SUPPLY SHARED WITH DGTOP | | POWER SUPPLY SHARED WITH DGTOP | | POWER SUPPLY SHARED WITH DGTOP | |
| | RDL (REPLACEMENT OF DGTOP POWER SUPPLY) | COMPATIBLE WITH 2-BIT SERIAL ARRAY ARRANGEMENT FOR 14 BITS | | IF LATCH CIRCUIT ABOLISHED | | IF LATCH CIRCUIT ABOLISHED | | IF LATCH CIRCUIT ABOLISHED | | IF LATCH CIRCUIT ABOLISHED | |
| | CODE CONVERTER | 2 BITS + FF | | 2 BITS + FF | | G2B IS INTEGRATED WITH GCL | | G2B IS INTEGRATED WITH GCL | | G2B IS INTEGRATED WITH GCL | |
| | TEMPORARY LATCH CIRCUIT COMPATIBLE WITH SCAN | COMPATIBLE WITH 2-BIT SERIAL ARRAY ARRANGEMENT FOR 14 BITS | | COMPATIBLE WITH 2-BIT SERIAL ARRAY ARRANGEMENT FOR 14 BITS | | COMPATIBLE WITH 2-BIT SERIAL | | WKL IS INTEGRATED WITH GCL OUTPUT SEL IS ADDED | | WKL IS INTEGRATED WITH GCL NO OUTPUT SEL | |
| | FULL ADDER | 2bit FF | | 2bit FF | | 2bit FF | | 2bit FF | | 2bit FF | |
| | | UNIT Tr NO. | NO. | BLOCK Tr NO. | UNIT Tr NO. | NO. | BLOCK Tr NO. | UNIT Tr NO. | NO. | BLOCK Tr NO. | UNIT Tr NO. | NO. | BLOCK Tr NO. | UNIT Tr NO. | NO. | BLOCK Tr NO. |
| COMPONENT-BY-COMPONENT TRANSISTOR SIZE | GRAY CODE LATCH (GCL) | | | 221 | | | 221 | | | 221 | | | 221 | | | 221 |
| | CODE CONVERTER (G2B) | 46 | | | 46 | | | 6 | 13 | 78 | 6 | 13 | 78 | 8 | 13 | 104 |
| | FULL ADDER (FA) | 78 | | | 78 | | | 78 | | | 78 | 1 | | 22 | 13 | 286 |
| | TEMPORARY LATCH CIRCUIT (WKL) | 224 | | | 224 | | | 16 | | 224 | 16 | 13 | 208 | 12 | 13 | 156 |
| | IF LATCH CIRCUIT (RDL) | 224 | | | 0 | | | 0 | | | 0 | | | 0 | | | 0 |
| | TOTAL | | | 815 | | | 591 | | | 663 | | | 607 | | | 789 |
| LATENCY | NO. OF ADDITIONAL PASSING SIGNALS IN GCL | | | 0 | | | 0 | | | 1 | | | 3 | | | 2 |
| | GCL-GB PREPROCESSING P PHASE | | | 6 | | | 6 | | | 0 | | | 0 | | | 0 |
| | GCL-GB PREPROCESSING D PHASE | | | 6 | | | 6 | | | 0 | | | 0 | | | 0 |
| | GCL-GB-FA (THROUGH)-WKL P PHASE | | | 7 | | | 7 | | | 7 | | | 7 | | | 7 |
| | GCL-GB-WKL-FA-RDLL D PHASE | | | 7 | | | 7 | | | 7 | | | 7 | | | 7 |
| | RDL-DG | | | 7 | | | 0 | | | 0 | | | 0 | | | 0 |
| | TOTAL | | | 33 | | | 26 | | | 14 | | | 7 | | | 7 |
| | NO. OF PASSING SIGNALS IN GCL (MAXIMUM) | | | 3 | | | 5 | | | 4 | | | 6 | | | 5 |
| | CIRCUIT CONFIGURATION | KNOWN CONFIGURATION | | IF LATCH CIRCUIT ABOLISHED | | PARALLEL ARRANGEMENT OF G2B, IF LATCH CIRCUIT ABOLISHED | | PARALLEL ARRANGEMENT OF G2B, WKL, IF LATCH CIRCUIT ABOLISHED | | PARALLEL ARRANGEMENT OF G2B, WKL, FA, IF LATCH CIRCUIT ABOLISHED | |

IMAGING ELEMENT, SIGNAL PROCESSING METHOD FOR IMAGING ELEMENT, AND ELECTRONIC EQUIPMENT

TECHNICAL FIELD

The present technology relates to an imaging element. In particular, the present technology relates to an imaging element equipped with an analog-to-digital converting circuit, a signal processing method for the imaging element, and electronic equipment.

BACKGROUND ART

Imaging elements such as CMOS image sensors are equipped with an analog-to-digital converting circuit that converts an analog pixel signal read out from a pixel into a digital pixel signal. What is generally called a single-slope analog-to-digital converting circuit is known as one of the known analog-to-digital converting circuits. An imaging element equipped with a single-slope analog-to-digital converting circuit employs, for each column, a method of latching a Gray code instead of using a counter in order to reduce power consumption. Additionally, the use of the Gray code requires binary conversion in order to execute correlated double sampling (CDS) processing. Accordingly, in the arrangement, a Gray code latch circuit is followed by a code converter (see, for example, PTL 1).

CITATION LIST

Patent Literature

[PTL 1]
PCT Patent Publication No. WO2018/123609

SUMMARY

Technical Problem

In the known art described above, data transfer between the Gray code latch circuit and the code converter is configured as serial transfer in order to reduce the number of signals. Meanwhile, a clock frequency required for serial transfer presents a problem in increasing the speed of an operation of a column processing section. A configuration that processes all bits in parallel is most effective in reducing the clock frequency. However, problems with the configuration that processes all bits in parallel include an increased number of wires for the column processing section and an increased area of the column processing section.

The present technology has been created in view of these circumstances, and an object of the present technology is to reduce the number of serial transfer operations and increase the speed of the operation of the column processing section.

Solution to Problem

The present technology has been made to solve the problem described above. A first aspect of the present technology is an imaging element including a pixel array section having disposed therein multiple pixels each including a photoelectric converting section, and an analog-to-digital converting section configured to convert an analog pixel signal read out from the pixels into a digital pixel signal. The analog-to-digital converting section includes a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between a binary code for the same bit resulting from code-conversion by the code converter and the predetermined binary code latched in the temporary latch circuit. Data transfer between the Gray code latch circuit and the code converter is processed in parallel a predetermined number of bits at a time, and an output from the code converter is transferred to the arithmetic section through data lines the number of which corresponds to the predetermined number of bits. This is effective in enabling a reduction in the number of serial transfer operations and an increase in the speed of an operation of a column processing section.

Additionally, in the first aspect, the code converter can be configured to be disposed in parallel with the Gray code latch circuit for each bit. This is effective in allowing a configuration of a serial transfer system to be simplified.

Additionally, in the first aspect, the code converter may be disposed in parallel on a least significant bit side of the Gray code latch circuit when a signal is sent to the code converter from a most significant bit side. This is effective in allowing parallel processing of data transfer to be achieved without the need to increase the number of signal lines within the analog-to-digital converting section.

Additionally, in the first aspect, the Gray code latch circuit and the code converter may be configured as a cell for each bit. This is effective in enabling a reduction in the number of elements constituting the circuit and a reduction in circuit area.

Additionally, in the first aspect, further, data transfer between the code converter and the temporary latch circuit may be processed in parallel a predetermined number of bits at a time, the output from the code converter may be transferred to the arithmetic section through first data lines the number of which corresponds to the predetermined number of bits, and an output from the temporary latch circuit may be transferred to the arithmetic section through second data lines the number of which corresponds to the predetermined number of bits. This is further effective in enabling a reduction in the number of serial transfer operations, simplification of the configuration of the serial transfer system, and an increase in the speed of the operation of the column processing section.

Additionally, in the first aspect, the temporary latch circuit may be disposed in parallel with the code converter disposed in parallel on the least significant bit side of the Gray code latch circuit for each bit. This is further effective in allowing the configuration of the serial transfer system to be simplified.

Additionally, in the first aspect, the Gray code latch circuit, the code converter, and the temporary latch circuit may be configured as a cell for each bit. This is effective in enabling a reduction in the number of elements constituting the circuit and a reduction in circuit area.

Additionally, in the first aspect, further, data transfer between the temporary latch circuit and the arithmetic section may be processed in parallel a predetermined number of bits at a time, and an output from the arithmetic section may be output to outside through data lines the number of which corresponds to the predetermined number of bits. This is further effective in enabling a reduction in the number of serial transfer operations and an increase in the speed of the operation of the column processing section.

Additionally, in the first aspect, the arithmetic section may be disposed in juxtaposition with the temporary latch circuit and in parallel with the code converter disposed in parallel on the least significant bit side of the Gray code latch circuit for each bit. This is further effective in allowing the configuration of the serial transfer system to be simplified.

Additionally, in the first aspect, the Gray code latch circuit, the code converter, the temporary latch circuit, and the arithmetic section may be configured as a cell for each bit. This is further effective in enabling a reduction in the number of elements constituting the circuit and a reduction in circuit area.

Additionally, a second aspect of the present technology is a signal processing method for an imaging element including a pixel array section having disposed therein multiple pixels each including a photoelectric converting section, and an analog-to-digital converting section configured to convert an analog pixel signal read out from the pixels into a digital pixel signal. The analog-to-digital converting section includes a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between the binary code for the same bit resulting from code-conversion by the code converter and the predetermined binary code latched in the temporary latch circuit. Data transfer between the Gray code latch circuit and the code converter is processed in parallel a predetermined number of bits at a time, and an output from the code converter is transferred to the arithmetic section through data lines the number of which corresponds to the predetermined number of bits. This is effective in enabling a reduction in the number of serial transfer operations and an increase in the speed of the operation of the column processing section.

Additionally, in the second aspect, further, data transfer between the code converter and the temporary latch circuit may be processed in parallel a predetermined number of bits at a time, the output from the code converter may be transferred to the arithmetic section through first data lines the number of which corresponds to the predetermined number of bits, and an output from the temporary latch circuit may be transferred to the arithmetic section through second data lines the number of which corresponds to the predetermined number of bits. This is further effective in enabling a reduction in the number of serial transfer operations, simplification of the configuration of the serial transfer system, and an increase in the speed of the operation of the column processing section.

Additionally, in the second aspect, further, data transfer between the temporary latch circuit and the arithmetic section may be processed in parallel a predetermined number of bits at a time, and an output from the arithmetic section may be output to outside through data lines the number of which corresponds to the predetermined number of bits. This is further effective in enabling a reduction in the number of serial transfer operations and an increase in the speed of the operation of the column processing section.

Additionally, a third aspect of the present technology is electronic equipment including an imaging element including a pixel array section having disposed therein multiple pixels each including a photoelectric converting section, and an analog-to-digital converting section configured to convert an analog pixel signal read out from the pixels into a digital pixel signal. The analog-to-digital converting section includes a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between the binary code for the same bit resulting from code-conversion by the code converter and the predetermined binary code latched in the temporary latch circuit. Data transfer between the Gray code latch circuit and the code converter is processed in parallel a predetermined number of bits at a time, and an output from the code converter is transferred to the arithmetic section through data lines the number of which corresponds to the predetermined number of bits. This is effective in enabling a reduction in the number of serial transfer operations and an increase in the speed of the operation of the column processing section.

Additionally, in the third aspect, further, data transfer between the code converter and the temporary latch circuit may be processed in parallel a predetermined number of bits at a time, the output from the code converter may be transferred to the arithmetic section through first data lines the number of which corresponds to the predetermined number of bits, and an output from the temporary latch circuit may be transferred to the arithmetic section through second data lines the number of which corresponds to the predetermined number of bits. This is further effective in enabling a reduction in the number of serial transfer operations, simplification of the configuration of the serial transfer system, and an increase in the speed of the operation of the column processing section.

Additionally, in the third aspect, further, the data transfer between the temporary latch circuit and the arithmetic section may be processed in parallel a predetermined number of bits at a time, and an output from the arithmetic section may be output to outside through data lines the number of which corresponds to the predetermined number of bits. This is further effective in enabling a reduction in the number of serial transfer operations and an increase in the speed of the operation of the column processing section.

BRIEF DESCRIPTION OF DRAWINGS

FIG. 4 is a block diagram illustrating a comparative example of a column counter using a Gray code latch circuit and a code converter.

FIG. 5 is a diagram for describing Operation Example 1 of a logical operation circuit.

FIG. 6 is a diagram for describing Operation Example 2 of the logical operation circuit.

FIG. 12 is a circuit diagram illustrating circuit examples of the code converter.

FIG. 23 is a diagram illustrating an example of comparison between a known example and each example of the present technology in terms of control clock frequency and the like.

DESCRIPTION OF EMBODIMENT

A form in which the present technology is implemented (hereinafter referred to as an embodiment) will be described below in detail with reference to the drawings. The present technology is not limited to the embodiment. In the description below, the same reference signs are used for the same elements or elements with the same functions, and duplicate descriptions are omitted. Note that the description is given in the following order.

1. Imaging Element of Present Technology
   1-1. Configuration Example of Imaging Element
   1-2. Circuit Example of Pixel
   1-3. Configuration Example of Analog-to-Digital Converting Section
   1-4. Known Example of Column Counter
2. Analog-to-Digital Converting Section in Embodiment of Present Technology
   2-1. Example 1 (Example of Parallel Processing of Data Transfer between Gray Code Latch Circuit and Code Converter)
   2-2. Example 2 (Variation of Example 1)
   2-3. Example 3 (Example of Parallel Processing of Data Transfer between Gray Code Latch Circuit and Code Converter and Data Transfer between Code Converter and Temporary Latch Circuit)
   2-4. Example 4 (Example of Parallel Processing of Data Transfer between Gray Code Latch Circuit and Code Converter, Data Transfer between Code Converter and Temporary Latch Circuit, and Data Transfer between Temporary Latch Circuit and Full Adder)
   2-5. Comparison between Known Example and Each Example of Present Technology
   2-6. Actions and Effects of Embodiment of Present Technology
3. Variation
4. Examples of Application to Electronic Equipment
5. Applied Examples of Embodiment of Present Technology
6. Configurations that Can Be Taken by Present Technology 1. Imaging Element of Present Technology As an imaging element of the present technology, for example, a CMOS (Complementary Metal Oxid Semiconductor) image sensor can be illustrated that is a type of X-Y addressing imaging element. The CMOS image sensor is an image sensor produced by applying or partly using a CMOS process.

1-1. Configuration Example of Imaging Element

Figure 1:
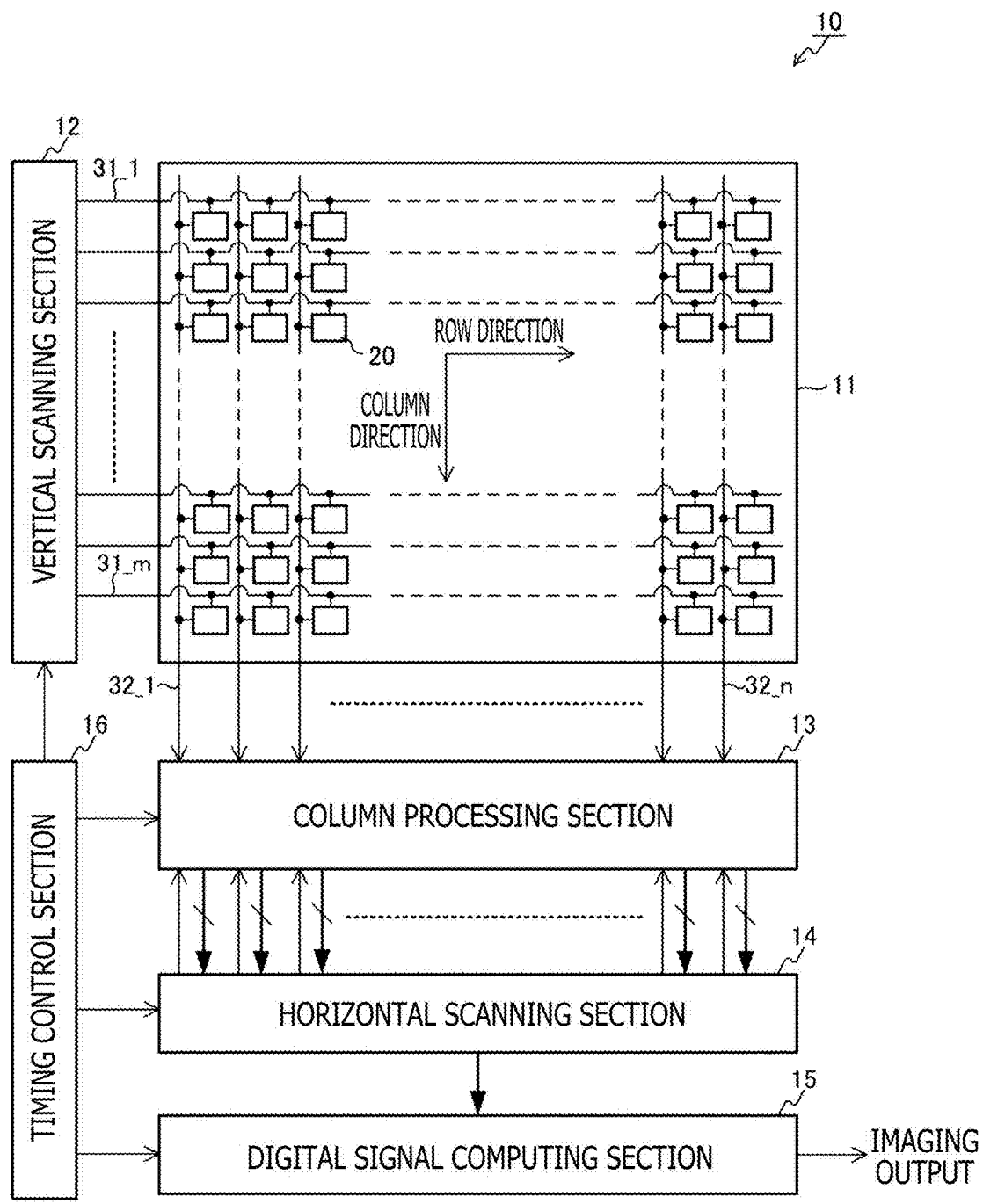
FIG. 1 is a system configuration diagram illustrating a configuration example of an imaging element in an embodiment of the present technology.

FIG. 1 is a system configuration diagram illustrating a configuration example of the imaging element of the present technology. An imaging element 10 includes a pixel array section 11 and a peripheral circuit section of the pixel array section 11. The peripheral circuit section of the pixel array section 11 includes, for example, a vertical scanning section 12, a column processing section 13, a horizontal scanning section 14, a digital signal computing section 15, a timing control section 16, and the like.

The pixel array section 11 includes pixels (pixel circuits) 20 disposed in a row direction and a column direction, that is, two-dimensionally disposed in a matrix, the pixels 20 each including a photoelectric converting element. Here, the row direction refers to an array direction of the pixels 20 in pixel rows, and the column direction refers to an array direction of the pixels 20 in pixel columns. The pixels 20 perform photoelectric conversion to generate and accumulate photocharge according to the amount of light received. In the example illustrated in FIG. 1, the pixel array of the pixel array section 11 includes m rows and n columns. That is, m represents the number of rows, and n represents the number of columns.

For the pixel array in m rows and n columns, the pixel array section 11 includes pixel control lines 31 (31_1 to 31_m) for the respective pixel rows laid along the row direction. Additionally, vertical signal lines 32 (32_1 to 32_n) for the respective pixel columns are laid along the column direction.

When signals are read out from the pixels 20, the pixel control line 31 (31_1 to 31_m) transmits a driving signal output from the vertical scanning section 12 on a per-pixel-row basis. In FIG. 1, the pixel control line 31 is illustrated as one wire, but the number of pixel control lines 31 is not limited to one. One end of the pixel control line 31 is connected to an output end corresponding to each row of the vertical scanning section 12. The vertical signal line 32 (32_1 to 32_n) transmits, to the column processing section 13, signals read out from the pixels 20.

Description will hereinafter be given of the components of the peripheral circuit section of the pixel array section 11, that is, the vertical scanning section 12, the column processing section 13, the horizontal scanning section 14, the digital signal computing section 15, and the timing control section 16.

The vertical scanning section 12 includes a shift register, an address decoder, and the like, and at the time of selection from the pixels 20 in the pixel array section 11, controls scanning of the pixel rows and addresses of the pixel rows on the basis of timing control signals fed from the timing control section 16. The illustration of specific configuration of the vertical scanning section 12 is omitted, but in general, the vertical scanning section 12 includes two scanning systems, that is, a readout scanning system and a sweeping scanning system.

On the basis of the timing control signals fed from the timing control section 16, the column processing section 13 reads out signals from the pixels 20 through the vertical signal lines 32 (32_1 to 32_n) in each pixel column of the pixel array section 11, executes analog-to-digital converting processing, correlated double sampling processing (CDS processing), and the like on the signals, and outputs the processed signals as pixel signals. The analog-to-digital converting section, which is a functional section of the column processing section 13, will be described below.

The horizontal scanning section 14 includes a shift register, an address decoder, and the like, and, on the basis of the timing control signals fed from the timing control section 16, selectively scans in turn unit circuits which correspond to the pixel columns of the column processing section 13. The selective scanning by the horizontal scanning section 14 causes pixel signals converted into digital signals in the column processing section 13 on a per-unit-circuit basis to be output in turn to the digital signal computing section 15.

On the basis of the timing control signals fed from the timing control section 16, the digital signal computing section 15 executes a predetermined digital computation on the pixel signals output in turn from the horizontal scanning section 14, and provides the result of the computation as an imaging output.

The timing control section 16 generates various timing signals, clock signals, control signals, and the like on the basis of synchronizing signals externally provided. Then, on the basis of the signals generated, the timing control section 16 performs driving control on the vertical scanning section 12, the column processing section 13, the horizontal scanning section 14, the digital signal computing section 15, and the like.

1-2. Circuit Example of Pixel

Figure 2:
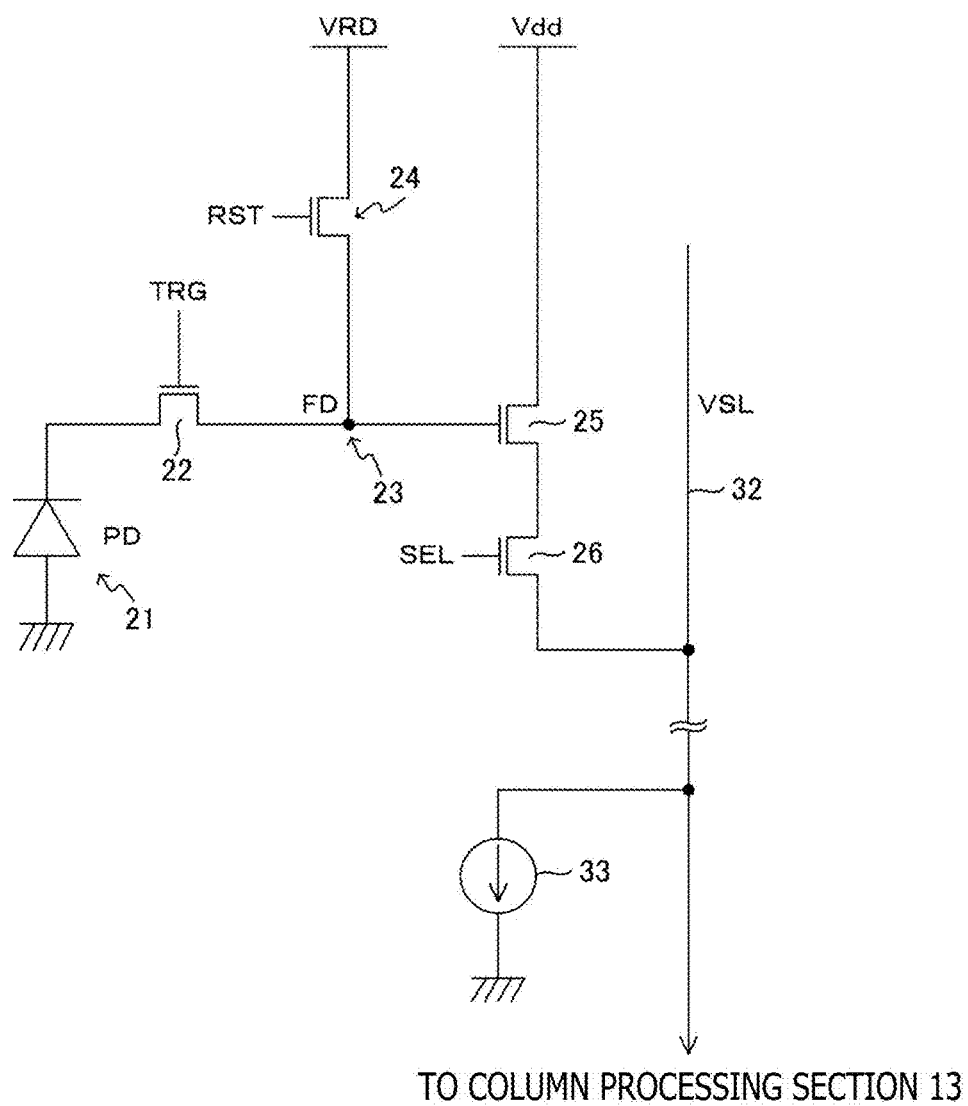
FIG. 2 is a circuit diagram illustrating a circuit example of a pixel (pixel circuit) in the imaging element in the embodiment of the present technology.

FIG. 2 is a circuit diagram illustrating a circuit example of the pixel (pixel circuit) 20 of the imaging element 10 in the embodiment of the present technology. Each pixel 20 of the pixel array section 11 includes a photoelectric converting section 21, a charge transfer section 22, a charge voltage converting section 23, a charge resetting section 24, a signal amplifying section 25, and a pixel selecting section 26.

Here, for example, N channel MOS field effect transistors can be used as the charge transfer section 22, the charge resetting section 24, the signal amplifying section 25, and the pixel selecting section 26. However, the combination of conductivity types of the four transistors 22, 24, 25, 26 illustrated here is only an example, and the present embodiment is not limited to the combination of these transistors.

For the pixels 20, as the pixel control lines 31 (31_1 to 31_m) described above, multiple pixel control lines are each shared by the pixels 20 in the same pixel row. The multiple pixel control lines are connected to output ends of the vertical scanning section 12 corresponding to the pixel rows on a per-pixel-row basis. The vertical scanning section 12 outputs a transfer signal TRG, a reset signal RST, and a select signal SEL to the multiple pixel control lines as appropriate.

Note that a constant current source 33 is connected to one end of the vertical signal line 32 installed for each of the pixel columns of the pixel array section 11.

The photoelectric converting section 21 is a PN junction photo diode (PD). The photo diode has an anode electrode connected to a low potential side power supply (for example, ground), and generates and accumulates charge corresponding to the amount of incident light.

The charge transfer section 22 transfers the charge accumulated in the photoelectric converting section 21 to the charge voltage converting section 23, according to the transfer signal TRG provided from the vertical scanning section 12. Specifically, the vertical scanning section 12 provides the transfer signal TRG, which is active at a high level, to a gate electrode of the transistor constituting the charge transfer section 22. Then, the transistor constituting the charge transfer section 22 is brought into a conductive state to transfer, to the charge voltage converting section 23, the charge accumulated in the photoelectric converting section 21.

The charge voltage converting section 23 is the capacitance of a floating diffusion (FD) region formed between a drain region of the transistor constituting the charge transfer section 22 and a source region of the transistor constituting the charge resetting section 24. The charge voltage converting section 23 converts the charge transferred from the photoelectric converting section 21 by the charge transfer section 22, into a voltage.

The charge resetting section 24 resets the charge accumulated in the charge voltage converting section 23, according to the reset signal RST provided from the vertical scanning section 12. Specifically, the vertical scanning section 12 provides the reset signal RST, which is active at a high level, to a gate electrode of the transistor constituting the charge resetting section 24. Then, the transistor constituting the charge resetting section 24 is brought into a conductive state to reset the charge accumulated in the charge voltage converting section 23.

The signal amplifying section 25 amplifies the voltage resulting from the conversion by the charge voltage converting section 23, and outputs a pixel signal of a level corresponding to the charge accumulated in the charge voltage converting section 23. The transistor constituting the signal amplifying section 25 has a gate electrode connected to the charge voltage converting section 23, and a drain electrode connected to a node of a power supply voltage Vdd. The transistor constituting the signal amplifying section 25 acts as an input section of a readout circuit that reads out charge obtained by the photoelectric conversion in the photoelectric converting section 21, that is, a source follower circuit. In other words, the transistor constituting the signal amplifying section 25 has a source electrode connected to the vertical signal line 32 via the pixel selecting section 26 to constitute a source follower circuit with the constant current source 33 connected to one end of the vertical signal line 32.

The pixel selecting section 26 selects any one of the pixels 20 in the pixel array section 11 during the selective scanning by the vertical scanning section 12. The transistor constituting the pixel selecting section 26 is connected between the vertical signal line 32 and the source electrode of the transistor constituting the signal amplifying section 25, and has a gate electrode to which the vertical scanning section 12 feeds the select signal SEL, which is active at a high level. Then, when the select signal SEL switches to the high level, the transistor constituting the pixel selecting section 26 is set to a conductive state. This sets the pixel 20 to a selected state. When the pixel 20 is set to the selected state, a signal output from the signal amplifying section 25 is read out to the column processing section 13 via the vertical signal line 32.

The pixel 20 in the circuit configuration example described above sequentially outputs a reset signal (what is generally called a P phase signal), which is at a reset level used when the charge resetting section 24 resets the charge voltage converting section 23, and a data signal (what is generally called a D phase signal), which is at a signal level corresponding to the charge based on the photoelectric conversion in the photoelectric converting section 21. That is, the pixel signals output from the pixels 20 include the reset signal provided at the time of resetting and the data signal provided at the time of the photoelectric conversion in the photoelectric converting section 21.

1-3. Basic Configuration Example of Analog-Digital Converting Section

Figure 3:
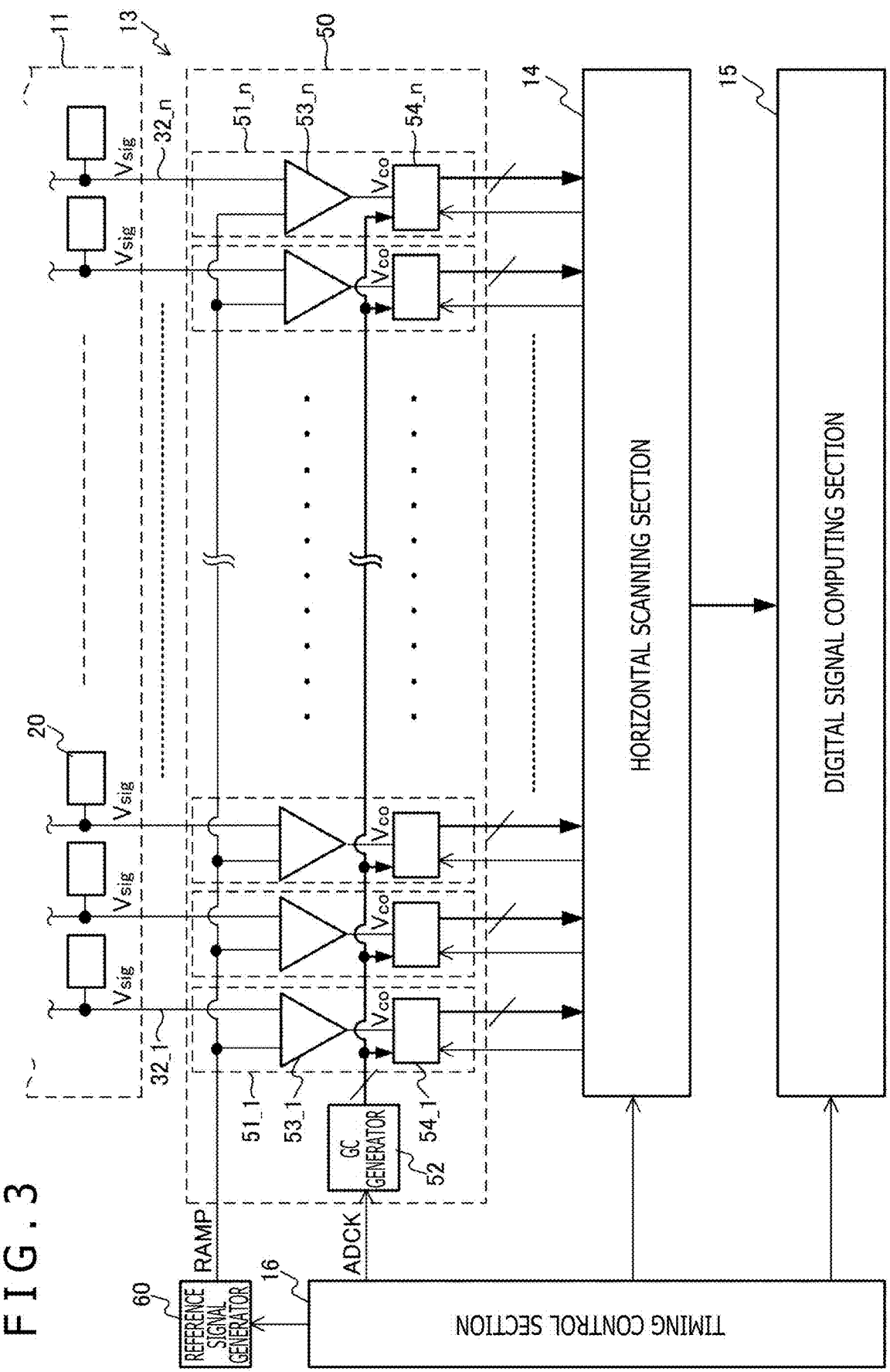
FIG. 3 is a block diagram illustrating a basic configuration example of an analog-to-digital converting section of the imaging element in the embodiment of the present technology.

Now, description will be given of a basic configuration example of the analog-to-digital converting section, which is a functional section of the column processing section 13. FIG. 3 is a block diagram illustrating a basic configuration example of the analog-to-digital converting section of the imaging element 10 in the embodiment of the present technology. FIG. 3 also illustrates a peripheral circuit section of the analog-to-digital converting section.

An analog-to-digital converting section 50 that is a functional section of the column processing section 13 acquires analog pixel signals fed from the pixels 20 of the pixel array section 11 through the vertical signal lines 32_1 to 32_n, on a per-pixel-row basis, on the basis of the timing control signals fed from the timing control section 16, and sequentially converts the analog pixel signals into digital pixel signals.

The analog-to-digital converting section 50 includes multiple (n) analog-to-digital converting circuits 51_1 to 51_n provided in a manner corresponding to the pixel columns of the pixel array section 11, and a Gray code generator 52. The imaging element 10 in the embodiment of the present technology uses, as each of the analog-to-digital converting circuits 51_1 to 51_n, for example, what is generally called a single-slope analog-to-digital converting circuit, which is an example of a reference signal comparison analog-to-digital converting circuit.

The analog-to-digital converting section 50 using single-slope analog-to-digital converting circuits uses, as a reference signal for analog-to-digital conversion, what is generally called a reference signal RAMP of a ramp wave having a level (voltage) varying over time (for example, decreases monotonously). The reference signal RAMP of the ramp wave is generated by a reference signal generator 60 on the basis of the timing control signal fed from the timing control section 16. The reference signal generator 60 can be configured using, for example, a digital-to-analog converting circuit.

Under the control of the timing control section 16, the Gray code generator 52 generates, in synchronism with generation of the reference signal RAMP by the reference signal generator 60, a Gray code (GC) having, in binary representation, a change of only one bit between adjacent values. Specifically, on the basis of a clock signal ADCK fed from the timing control section 16, the Gray code generator 52 generates a Gray code corresponding to a rate at which the waveform (level) of the reference signal RAMP generated by the reference signal generator 60 varies.

The analog-to-digital converting circuits 51_1 to 51_n respectively include comparators 53_1 to 53_n and column counters 54_1 to 54_n.

Each of the comparators 53_1 to 53_n compares the reference signal RAMP, generated by the reference signal generator 60 as a reference input, with an analog pixel signal Vsig fed from the respective pixel 20 of the pixel array section 11 through a respective one of the vertical signal lines 32_1 to 32_n as a comparison input. Then, for example, at a timing when the reference signal RAMP of the ramp wave exceeds the voltage value of the analog pixel signal Vsig, a corresponding one of the comparators 53_1 to 53_n feeds a corresponding one of the column counters 54_1 to 54_n with a signal (comparison result) Vco indicating that the reference signal RAMP has exceeded the voltage value. At a timing when any of the column counters 54_1 to 54_n is fed from a corresponding one of the comparators 53_1 to 53_n with the signal Vco indicating that the voltage value of the analog pixel signal Vsig has exceeded the reference signal RAMP, the column counter latches the Gray code fed from the Gray code generator 52 and outputs the Gray code to the horizontal scanning section 14.

The analog-to-digital converting section 50 including the single-slope analog-to-digital converting circuits 51_1 to 51_n described above allows a digital value to be obtained from time information regarding the time until a change in magnitude relation between the reference signal RAMP generated by the reference signal generator 60 and the analog pixel signal Vsig read out from the corresponding pixel 20 through a corresponding one of the vertical signal lines 32_1 to 32_n.

1-4. Known Example of Column Counter

The basic configuration example of the single-slope analog-to-digital converting section 50 using the Gray code (GC) has been described above. However, the column counters 54_1 to 54_n in practice use a Gray code latch circuit to reduce power consumption of the counter circuit. Additionally, to execute CDS processing (correlated double sampling processing) on an output from the Gray code latch circuit, a converter is used that converts the Gray code into a binary code (hereinafter simply referred to as a "code converter").

Here, a known example of the column counters 54_1 to 54_n using the Gray code latch circuit and the code converter will be described. FIG. 4 is a block diagram illustrating a comparative example of the column counters 54_1 to 54_n using the Gray code latch circuit and the code converter. FIG. 4 illustrates each of the column counters 54_1 to 54_n for one pixel column as the column counter 54.

The column counter 54 according to a known example includes a Gray code latch circuit 541, a code converter 542, a full adder 543 as an arithmetic section, a temporary latch (WKL: Work Latch) circuit 544, and an IF (interface) latch circuit 545. Here, the code converter 542 and the full adder 543 constitute an arithmetic logic unit (ALU) 546.

In the column counter 54 according to the known example configured as descried above, the Gray code latch circuit 541 latches, under the control of the timing control section 16, the Gray code fed from the Gray code generator 52, at the timing when the Gray code latch circuit 541 is fed from any of the comparators 53_1 to 53_n with the signal (comparison result) Vco indicating that the reference signal RAMP of the ramp wave has exceeded the voltage value of the analog pixel signal Vsig.

Under the control of the timing control section 16, the code converter 542 converts, into a binary code, the Gray code that corresponds to the voltage value of the analog pixel signal Vsig and that is latched in the Gray code latch circuit 541, and outputs the binary code to the full adder 543. Under the control of the timing control section 16, the full adder 543 adds, to the binary code, a binary code stored in the temporary latch circuit 544 and outputs an addition result to the IF latch circuit 545.

That is, the arithmetic logic unit (ALU) 546 including the code converter 542 and the full adder 543 utilizes the temporary latch circuit 544 to convert, into a binary code, the Gray code corresponding to the voltage value of the analog pixel signal Vsig latched in the Gray code latch circuit 541. During the code conversion, the arithmetic logic unit 546 executes CDS (correlated double sampling) processing that is an example of noise removal processing. The CDS processing will be specifically described below.
(Example of CDS Processing)

First, with the charge voltage converting section 23 of the pixel 20 reset, a signal read out from the pixel 20, that is, the Gray code corresponding to a P phase signal, is latched in the Gray code latch circuit 541. Then, the code converter 542 converts, into a binary code, the Gray code that is latched in the Gray code latch circuit 541 and that corresponds to the P phase signal, and outputs the binary code to the full adder 543. At this time, under the control of the timing control section 16, the full adder 543 is reset, then computes (adds/subtracts) a binary code that is stored in the temporary latch circuit 544 and that includes bits all set to 0, and causes the temporary latch circuit 544 to latch the binary code. The processing up to this latching causes the binary code obtained by code-converting the Gray code for the P phase signal read out from the pixel 20 to be latched in the temporary latch circuit 544.

Subsequently, under the control of the timing control section 16, resetting the Gray code latch circuit 541 causes the Gray code corresponding to a signal which corresponds to the amount of light received and which is based on photoelectric conversion in the pixel 20, that is, a D phase signal, to be latched in the Gray code latch circuit 541. Then, the code converter 542 converts, into a binary code, the Gray code latched in the Gray code latch circuit 541 and corresponding to the D phase signal, and outputs the binary code to the full adder 543. At this time, the full adder 543 adds (substantially subtracts), to the binary code for the D phase signal, the binary code for the P phase signal latched in the temporary latch circuit 544 and causes the IF latch circuit 545 to latch the result of the computation.

A series of processing operations described above determines a difference between the binary code for the P phase signal and the binary code for the D phase signal, and the IF latch circuit 545 substantially latches the pixel signal including the binary code subjected to the CDS processing.
(Operation Example of Column Counter)

Here, an operation example of the column counter 54 according to the known example will specifically be described, the operation being performed under the control of the timing control section 16.

For example, the Gray code latch circuit 541, the code converter 542, the full adder 543, the temporary latch circuit 544, and the IF latch circuit 545 are assumed to be reset under the control of the timing control section 16. Then, the Gray code including bits all set to 0 is assumed to be latched in the Gray code latch circuit 541, and the binary code including bits all set to 0 is assumed to be latched in the temporary latch circuit 544.

Here, the Gray code latch circuit 541 latches the Gray code that is generated by the Gray code generator 52 and that corresponds to, for example, an 11-bit P phase signal. Note that the number of bits of the Gray code is not limited to 11 bits, that is, the number may be several bits other than 11 bits. This also applies to the Gray code corresponding to the D phase signal.

The Gray code corresponding to the 11-bit P phase signal latched in the Gray code latch circuit 541 is serially transferred to the code converter 542 two bits at a time. Thus, the code converter 542 converts the Gray code latched in the Gray code latch circuit 541 and corresponding to the 11-bit P phase signal, into a binary code two bits at a time, and serially transfers the binary code to the full adder 543.

For the binary code into which the code converter 542 has converted the Gray code and which corresponds to the P phase signal, the full adder 543 executes computation (addition/subtraction) processing on the binary code stored in the temporary latch circuit 544 and including bits all set to 0. The result of the computation by the full adder 543 is latched in the temporary latch circuit 544 as a binary code corresponding to the P phase signal.

The above-described processing is repeated two bits at a time, with resultant data serially transferred. Thus, the temporary latch circuit 544 latches the binary code corresponding to the 11-bit P phase signal.

Then, the Gray code latch circuit 541 is reset and then latches a Gray code generated by the Gray code generator 52 and corresponding to, for example, an 11-bit D phase signal.

The Gray code latched in the Gray code latch circuit 541 and corresponding to the 11-bit D phase signal is serially transferred to the code converter 542 two bits at a time. Thus, the code converter 542 converts the Gray code latched in the Gray code latch circuit 541 and corresponding to the 11-bit D phase signal, into a binary code two bits at a time, and outputs the binary code to the full adder 543.

For the binary code into which the code converter 542 has converted the Gray code and which corresponds to the D phase signal, the full adder 543 executes computation (addition/subtraction) processing on the binary code stored in the temporary latch circuit 544 and corresponding to the P phase signal. The result of the computation by the full adder 543 is latched in the IF latch circuit 545 as a 12-bit binary code.

The above-described processing is repeated two bits at a time, with resultant data serially transferred. Thus, the IF latch circuit 545 latches the data of the 12-bit binary code subjected to the CDS processing.

Computation Example 1 of Arithmetic Logic Unit

Here, a computation example (Computation Example 1) of the arithmetic logic unit (ALU) 546 including the code converter 542 and the full adder 543 will be described.

In a case of converting a Gray code into a binary code one bit at a time, the code converter 542 repeats, for example, computation as illustrated in a left diagram of FIG. 5.

First, GC[10] that is the data of the 11th bit that is the most significant bit of a Gray code (GC) including 11 bits has the same value as that of BINa[10] that is the data of the 11th bit that is the most significant bit of an 11-bit binary code (BINa). Therefore, in processing step 1 that is the first processing operation, the code converter 542 determines BINa[10] from GC[10].

Then, BINa[9] that is the data of the 10th bit of the binary code is an exclusive OR (XOR) of GC[9] that is the data of the 10th bit of the Gray code and BINa[10] that is the data of the 11th bit that is a higher-order bit. Therefore, in processing step 2, the code converter 542 determines BINa[9] as an exclusive OR of BINa[10] and GC[9].

Further, BINa[8] that is the data of the 9th bit of the binary code is an exclusive OR (XOR) of GC[8] that is the data of the 9th bit of the Gray code and BINa[9] that is the data of the 10th bit that is a higher-order bit. Therefore, in processing step 3, the code converter 542 determines BINa[8] as an exclusive OR of BINa[9] and GC[8].

Subsequently, processing step 4 to processing step 11 are similarly repeated to sequentially convert 11-bit Gray codes GC[10], GC[9], GC[8], . . . , and GC[0] into 11-bit binary codes BINa[10], BINa[9], BINa[8], . . . , and BINa[0] starting with higher-order bits.

Additionally, as illustrated in the left diagram of FIG. 5, after the Gray codes are converted into binary codes, the full adder 543 repeats computation as illustrated in a right diagram of FIG. 5.

Note that, in FIG. 5, for example, binary codes that are pre-latched in the temporary latch circuit 544 are present and that the binary codes latched in the temporary latch circuit 544 are thus expressed as BINb[0] to BINb[10]. Additionally, in a case where the Gray code corresponding to a P phase signal is converted into a binary code, the binary code pre-latched in the temporary latch circuit 544 is a binary code including bits all being zero. Further, in a case where the Gray code corresponding to a D phase signal is converted into a binary code, the binary code latched in the temporary latch circuit 544 is a binary code including bits all corresponding to P phase signals.

That is, in processing step 1 that is the first processing operation, the full adder 543 executes computation (addition/subtraction) processing on the binary code BINa[0] of the first bit that is the least significant bit of the binary code fed from the code converter 542 and the binary code BINb[0] of the first bit that is the least significant bit of the binary code read out from the temporary latch circuit 544, to determine a binary code (C[0], BINs[0]) including the least significant bits and a carry bit. Here, C[0] is a carry bit for the first bits.

Then, in processing step 2, the full adder 543 executes computation (addition/subtraction) processing on the binary code BINa[1] of the second bit of the binary code fed from the code converter 542, the binary code BINb[1] of the second bit that is the least significant bit of the binary code read out from the temporary latch circuit 544, and C[0] that is the carry bit for the first bits, to determine a binary code (C[1], BINs[1]) including the second bits and a carry bit for the second bits. Here, C[1] is a carry bit for the second bits.

Further, in processing step 3, the full adder 543 executes computation (addition/subtraction) processing on the binary code BINa[2] of the third bit of the binary code fed from the code converter 542, the binary code BINb[2] of the third bit that is the binary code read out from the temporary latch circuit 544, and C[1] that is the carry bit for the second bits, to determine a binary code (C[2], BINs[2]) including the third bits and a carry bit for the third bits. Here, C[2] is a carry bit for the third bits.

Subsequently, the processing from processing step 4 to processing step 11 is repeated to compute (add/subtract) the binary codes BINb[0] to BINb[10] read out from the temporary latch circuit 544 and BINa[0] to BINa[10] fed from the code converter 542, to determine a pixel signal including 12-bit binary codes BINs[0] to BINs[10] and subjected to the CDS (correlated double sampling) processing.

However, in the case of the processing described with reference to FIG. 5, as illustrated in the left diagram of FIG. 5, the code converter 542 uses the processing from processing step 1 to processing step 11 to determine lower-order bits in turn starting with higher-order bits, so that binary codes corresponding to D phase signals are determined in the order of BINa[10], BINa[9], BINa[8], . . . , and BINa[0].

On the other hand, as illustrated in the right diagram of FIG. 5, the full adder 543 uses the processing from processing step 1 to processing step 11 to determine higher-order bits in turn starting with lower-order bits, so that binary codes representing pixel signals subjected to the CDS processing are determined in the order of BINs[1], BINS [2], BINs[3], . . . , and BINs[11].

Therefore, for example, in processing step 1, even when the code converter 542 directly outputs the binary code BINa[10] of the 11th bit to the full adder 543, the full adder 543 fails to perform the computation because, in processing step 1, the full adder 543 has not determined the required binary code BINa[0] of the first bit.

That is, to allow the full adder 543 to execute processing step 1, processing step 1 needs to be executed after the code converter 542 completes the processing from processing step 1 to processing step 11.

As a result, the code converter 542 and the full adder 543 fail to continuously compute the binary code of the same bit. This may prevent processing speed from being increased and require a configuration that temporarily stores binary codes of 11 bits that are the results of conversion by the code converter 542, leading to an increased footprint.

(Computation for Continuously Achieving Computation of Same Bit)

Therefore, the code converter 542 of the arithmetic logic unit (ALU) 546 of the column counter 54 according to the known example determines the Gray code of the least significant bit in advance by predetermined processing and utilizes the Gray code to generate binary codes in turn starting with the least significant bit.

That is, as described above, at the most significant bit, the binary code and the Gray code have the same value, and thus the relation indicated by Equation (1) below holds true.

$$BIN[MSB] = GC[MSB] \qquad (1)$$

Here, BIN[ ] is a binary code, GC[ ] is a Gray code, and MSB represents the most significant bit.

Additionally, the binary code BIN[n] of the nth bit is expressed by Equation (2) below.

$$BIN[n] = GC[n] \; xor \; BIN[n+1] \qquad (2)$$

Here, xor represents exclusive OR.

The relation in Equation (2) can be transformed into Equation (3) below.

$$BIN[n+1] = GC[n] \; xor \; BIN[n] \qquad (3)$$

Therefore, in a case where the binary code BIN[0] of the least significant bit can be determined for Equation (3), the code converter 542 can convert the Gray code into a binary code starting with the least significant bit.

Here, the least significant bit of the binary code BIN[LSB] (=BIN[0]) can be computed by Equation (4) below.

$$BIN[0] = GC[MSB] \; xor \; GC[MSB-1] \; xor \; GC[MSB-2] \; xor \ldots xor \quad (4)$$
$$GC[1]$$

That is, the least significant bit of the binary code BIN[0] is determined from exclusive OR of all the bits of the Gray code.

Computation Example 2 of Arithmetic Logic Unit

Therefore, the code converter 542 and the full adder 543 of the arithmetic logic unit (ALU) 546 in the column counter 54 use a procedure as the one illustrated in FIG. 6 to convert the Gray code into a binary code as Computation Example 2 of the arithmetic logic unit 546, and executes computation (addition/subtraction) processing related to the CDS.

The least significant bit of a parity including 11 bits, that is, P[0] that is the parity data of the first bit, is exclusive OR of 0 and GC[0] that is the data of the first bit of the Gray code. Therefore, in processing step 1, the code converter 542 determines, as exclusive OR of GC[0] and 0, P[0] that is the data of the first bit of the parity including 11 bits.

Then, P[1] that is the parity data of the second bit of the parity including 11 bits is exclusive OR of GC[1] that is the data of the second bit of the Gray code and P[0] that is the parity data of the first bit. Therefore, in processing step 2, the code converter 542 determines, as exclusive OR of GC[1] and P[0], P[1] that is the parity data of the second bit of the parity including 11 bits.

Further, P[2] that is the parity data of the third bit of the parity including 11 bits is exclusive OR of GC[2] that is the data of the third bit of the Gray code and P[1] that is the parity data of the second bit. Therefore, in processing step 3, the code converter 542 determines, as exclusive OR of GC[2] and P[1], P[2] that is the parity data of the third bit of the parity including 11 bits.

Processing step 4 to processing step 10 are similarly executed to determine P[9] that is the parity of the 10th bit of the parity including 11 bits. As a result, the parity P[9] is determined as excusive OR of GC[0] to GC[8] of the first bit to the 10th bit.

Then, in processing step 11, the code converter 542 determines the least significant bit of the binary code BINa[0] as exclusive OR of GC[10] corresponding to the most significant bit of the Gray code and the parity P[9] of the 10th bit, and outputs the least significant bit of the binary code BINa[0] to the full adder 543.

That is, the processing from processing step 1 to processing step 11 determines the least significant bit of the binary code BINa[0] indicated by Equation (4).

Here, the full adder 543 can acquire the least significant bit of the binary code BINb[0] from the temporary latch circuit 544. Therefore, in processing step 11, the full adder 543 further continuously executes computation (addition/subtraction) processing on the binary code BINa[0] of the first bit that is the least significant bit of the binary code fed from the code converter 542 and the binary code BINb[0] of the first bit that is the least significant bit of the binary code read out from the temporary latch circuit 544, to determine the binary code (C[0], BINs[0]) including the least significant bits and the carry bit.

Note that preprocessing by the code converter 542 hereinafter refers to the processing from processing step 1 to processing step 11, that is, the processing executed by the code converter 542 to determine the least significant bit of the binary code BINb[0].

Then, in processing step 12, the code converter 542 determines the binary code BINa[1] of the second bit of the binary code as exclusive OR of GC[1] corresponding to the second bit of the Gray code and BINa[0] that is the least significant bit of the binary code, and outputs the binary code BINa[1] to the full adder 543.

The full adder 543 further continuously executes computation (addition/subtraction) processing on the binary code BINa[1] of the second bit of the binary code fed from the code converter 542, the binary code BINb[1] of the second bit of the binary code read out from the temporary latch circuit 544, and the carry bit C[0], to determine the binary code (C[1], BINs[1]) including the second bits and the carry bit.

Additionally, in processing step 13, the code converter 542 determines the binary code BINa[2] of the third bit of the binary code as exclusive OR of GC[2] corresponding to the third bit of the Gray code and BINa[1] that is the second bit of the binary code, and outputs the binary code BINa[2] to the full adder 543.

The full adder 543 further continuously executes computation (addition/subtraction) processing on the binary code BINa[2] of the third bit of the binary code fed from the code converter 542, the binary code BINb[2] of the third bit of the binary code read out from the temporary latch circuit 544, and the carry bit C[1], to determine the binary code (C[2], BINs[2]) including the second bits and the carry bit.

Subsequently, the processing from processing step 14 to processing step 21 is similarly repeated to determine the binary codes BINs[0] to BINs[11]) including 12 bits.

The above-described processing enables the binary code BINa[0] of the least significant bit to be determined by the preprocessing in the code converter 542. Additionally, since the binary code BINa[0] of the least significant bit can be determined by the preprocessing, the code converter 542 can sequentially convert the Gray code into a binary code from the least significant bit toward higher-order bits. Furthermore, since the code converter 542 can sequentially convert the Gray code into a binary code from the least significant bit toward higher-order bits, the full adder 543 can execute the CDS processing by continuously utilizing the result of conversion by the code converter 542 to determine a difference from the binary code latched in the temporary latch circuit 544, from the least significant bit toward higher-order bits.

(Example of Circuit Configuration of Code Converter and Full Adder Implementing Arithmetic Logic Unit in Case of Conversion of Gray Code into Binary Code One Bit at Time)

Now, with reference to FIG. 7, a circuit configuration example of the code converter 542 and the full adder 543 implementing the arithmetic logic unit 546 in the case of conversion of a Gray code into a binary code for each bit will be described.

Figure 7:
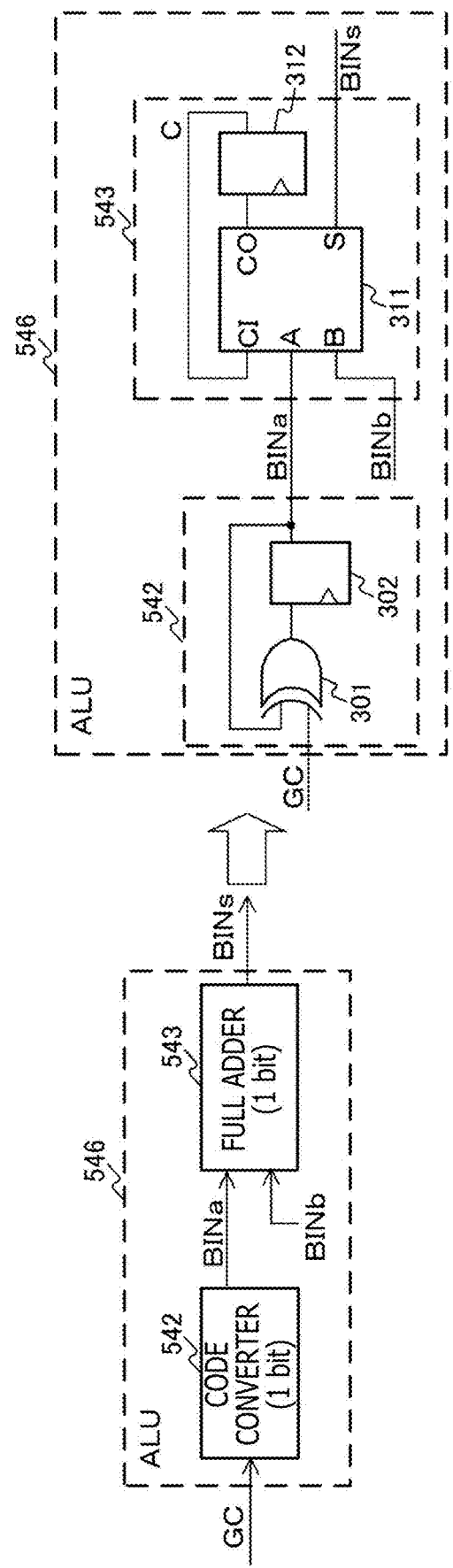
FIG. 7 is a block diagram illustrating a circuit configuration example of a logical operation circuit that converts a Gray code into a binary code one bit at a time.

For example, as illustrated in FIG. 7, the code converter 542 includes an XOR circuit (exclusive OR circuit) 301 and a DFF (D Flop-Flop circuit) 302.

The XOR circuit 301 outputs exclusive OR of an input value GC[n] of the Gray code and a conversion result BINa[n−1] for the last conversion into a binary code, to the DFF 302 as a conversion result BINa[n] of the binary code.

The DFF 302 temporarily stores the conversion result BINa[n] for conversion into a binary code from the Gray code output from the XOR circuit 301, and at the next timing, outputs the conversion result BINa[n] to the XOR circuit 301 and the full adder 543.

The full adder 543 includes an addition circuit 311 and a DFF 312.

The addition circuit 311 includes an input terminal A, an input terminal B, an output terminal S, an output terminal CO, and an input terminal CI. The input terminal A is a terminal that receives an input of the binary code BINa[n] fed from the code converter 542. The input terminal B is a terminal that receives the binary code BINb[n] fed from the temporary latch circuit 544. The output terminal S is a terminal that outputs the binary code BINs[n] corresponding to an addition result of the binary code BINa[n] fed from the code converter 542, the binary code BINb[n] fed from the temporary latch circuit 544, and the carry bit C[n−1]. The input terminal CI is a terminal that receives an input of the carry bit C[n−1] for the last processed bit fed from the output terminal CO that outputs the carry bit C[n] to the DFF 312 and from the DFF 312.

The addition circuit 311 outputs, from the output terminal S as the binary code BINs[n], an addition result for the binary code BINa[n] fed from the code converter 542 and input to the input terminal A, the binary code BINb[n] fed from the temporary latch circuit 544 and input to the input terminal B, and the carry bit C[n−1] for the last processed bit latched in the DFF 312. At this time, the addition circuit 311 outputs the carry bit C[n] to the DFF 312 for storage.

That is, the circuit configuration in FIG. 7 implements the arithmetic logic unit 546 that converts the Gray code as the one illustrated in FIG. 6 into a binary code for each bit.

(Example of Circuit Configuration of Code Converter and Full Adder Implementing Arithmetic Logic Unit in Case of Conversion of Gray Code into Binary Code Two Bits at Time)

Now, the arithmetic logic unit 546 of the column counter 54 in FIG. 4 converts the Gray code into a binary code two bits at a time.

Thus, with reference to FIG. 8, a circuit configuration example of the code converter 542 and the full adder 543 implementing the arithmetic logic unit 546 that converts the Gray code into a binary code two bits at a time will be described. The circuit configuration example illustrated in FIG. 8 is an application of the circuit configuration of the code converter 542 and the full adder 543 in FIG. 7 implementing the arithmetic logic unit 546 that converts the Gray code into a binary code one bit at a time.

Figure 8:
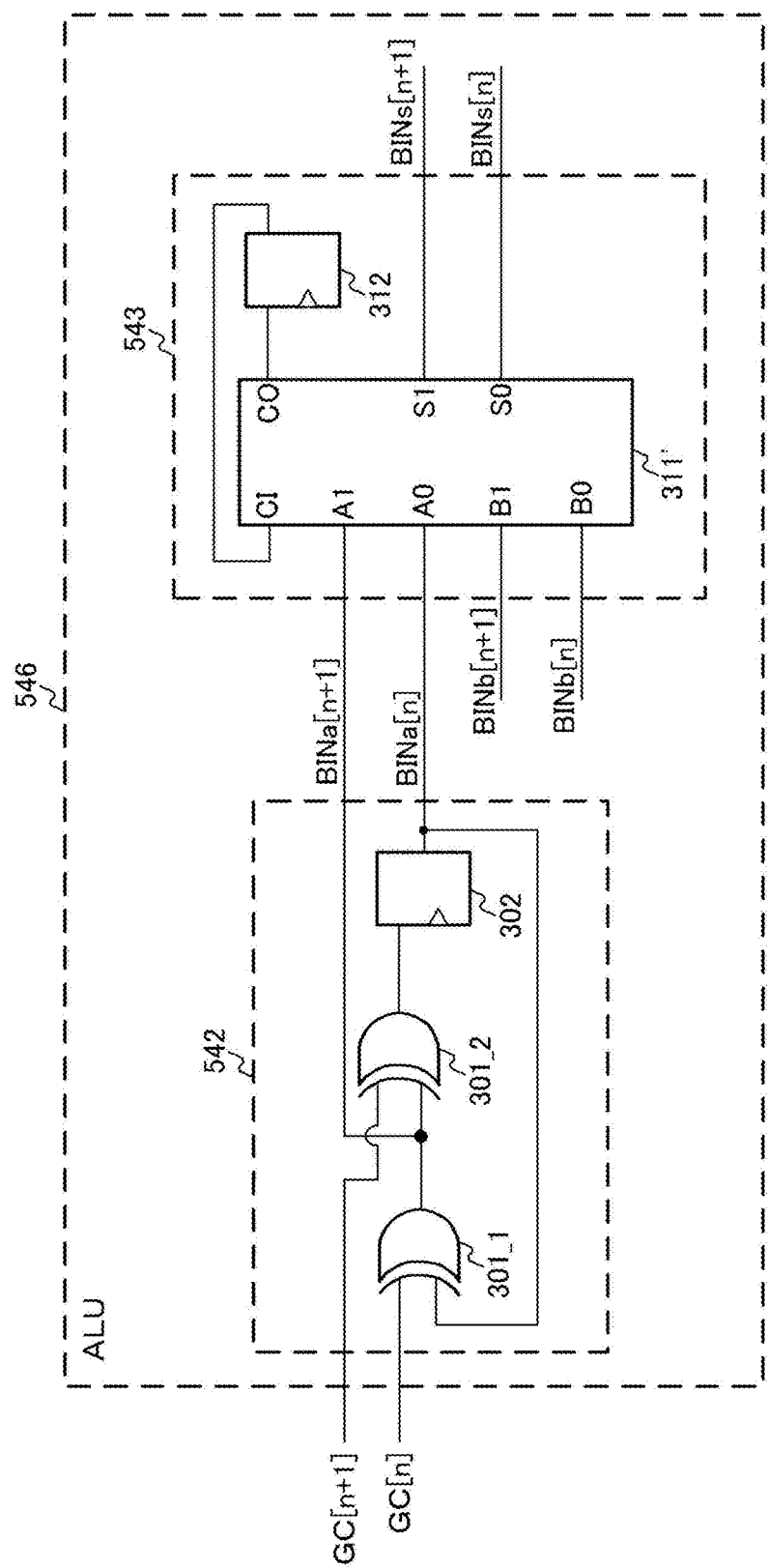
FIG. 8 is a block diagram illustrating a circuit configuration example of a logical operation circuit that converts a Gray code into a binary code two bits at a time.

Note that components in FIG. 8 providing the same functions as those of the corresponding components in FIG. 7 are denoted by the same reference signs, and description of these components is omitted as appropriate.

The code converter 542 in FIG. 8 is provided with XOR circuits 301_1 and 301_2 instead of the XOR circuit 301 in FIG. 7, and Gray codes GC[n] and GC[n+1] each with consecutive bits are input to the code converter 542. The XOR circuit 301_1 determines exclusive OR of the Gray code GC[n] and the binary code BINa[n] that is a processing result for the preceding bit, and outputs the exclusive OR to the XOR circuit 301_2 and an addition circuit 311' of the full adder 543.

The XOR circuit 301_2 determines exclusive OR of the Gray code GC[n+1] and a binary code BINa[n+1] that is an output from the XOR circuit 301_1, and outputs the exclusive OR to the DFF 302 as the binary code BINa[n].

The full adder 543 in FIG. 8 is provided with the addition circuit 311' instead of the addition circuit 311 in FIG. 7.

The addition circuit 311' adds together the binary code BINa[n+1] fed from the code converter 542 and input to an input terminal A1, a binary code BINb[n+1] fed from the temporary latch circuit 544 and input to an input terminal B1, and the carry bit C[n] for the last processed bit stored in the DFF 312. Then, the addition circuit 311' outputs, from an output terminal S1, a binary code BINs[n+1] that is the result of the addition.

Further, the addition circuit 311' adds together the binary code BINa[n] fed from the code converter 542 and input to an input terminal A0, the binary code BINb[n] fed from the temporary latch circuit 544 and input to an input terminal B0, and a carry bit C[n+1] for the last processed bit stored in the DFF 312. Then, the addition circuit 311' outputs, from an output terminal S0, a binary code BINs[n] that is the result of the addition.

At this time, the addition circuit 311' outputs the carry bits C[n] and C[n+1] to the DFF 312 for storage.

That is, the circuit configuration in FIG. 8 implements each processing operation as the one illustrated in FIG. 6, 2 steps at a time, realizing the arithmetic logic unit 546 that converts the Gray code into a binary code two bits at a time.

(Operation Processing Example of Column Counter)

Figure 9:
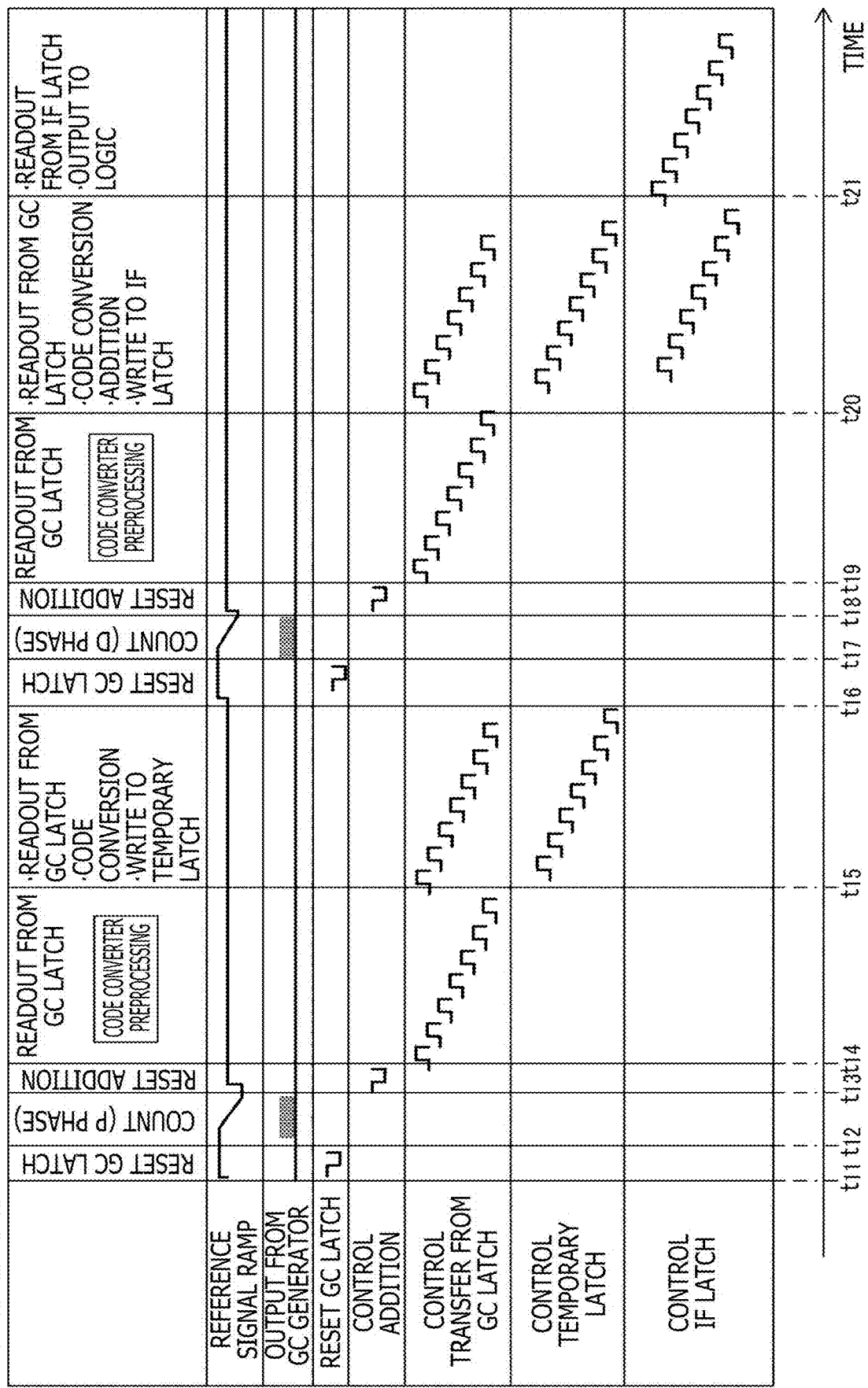
FIG. 9 is a timing chart for describing an operation processing example of a column counter according to a comparative example.

Now, with reference to FIG. 9, an operation processing example of the column counter 54 according to the known example illustrated in FIG. 4 will be described. FIG. 9 is a timing chart for describing the operation processing example of the column counter 54 according to the known example. The operation processing of the column counter 54 described below is assumed to be executed under the control of the timing control section 16.

During a period from time $t_{11}$ to time $t_{12}$, the Gray code (GC) latch circuit 541 is reset and initialized. That is, in the processing during this period, reception of the Gray code corresponding to the P phase signal is prepared for.

Then, during a period from time $t_{12}$ to time $t_{13}$, the Gray code generator 52 outputs a Gray code (GC), which is latched in the Gray code latch circuit 541. This processing is executed, for example, during a period when the ramp wave of the reference signal RAMP varies at a predetermined rate. More particularly, with the reference signal RAMP varying at the predetermined rate, at a timing when the comparators 53_1 to 53_n (see FIG. 3) detect that the reference signal RAMP is greater than the pixel signal Vsig, the Gray code fed from the Gray code generator 52 is latched as the Gray code corresponding to the P phase signal.

Then, during a period from time $t_{13}$ to time $t_{14}$, the full adder 543 is reset (addition reset). Then, during a period from time $t_{14}$ to time $t_{15}$, the code converter 542 of the arithmetic logic unit 546 executes preprocessing for converting, into a binary code, the Gray code corresponding to the P phase signal to determine the binary code BIN[0] of the least significant bit.

Then, during a period from time $t_{15}$ to time $t_{16}$, the code converter 542 reads out the Gray code corresponding to the P phase signal latched in the Gray code latch circuit 541, converts the Gray code into a binary code, and outputs the binary code to the full adder 543. At this time, the full adder 543 executes computation (addition/subtraction) processing on the binary code of the P phase signal and a binary code with bits all being zero, latched in the temporary latch circuit 544, and causes the temporary latch circuit 544 to latch the result of the computation.

Then, during a period from time $t_{16}$ to time $t_{17}$, the Gray code latch circuit 541 is reset and initialized. That is, in the processing during this period, reception of the Gray code corresponding to the D phase signal is prepared for.

Then, during a period from time $t_{17}$ to time $t_{18}$, the Gray code generator 52 outputs a Gray code, which is latched in the Gray code latch circuit 541. This processing is executed, for example, during a period when the ramp wave of the reference signal RAMP varies at a predetermined rate. More particularly, with the ramp wave of the reference signal RAMP varying, at the timing when the comparators 53_1 to 53_$n$ (see FIG. 3) detect that the reference signal RAMP is greater than the pixel signal Vsig, the Gray code fed from the Gray code generator 52 is latched as the Gray code corresponding to the D phase signal.

Then, during a period from time $t_{15}$ to time $t_{19}$, the full adder 543 is reset (addition reset). Then, during a period from time $t_{19}$ to time $t_{20}$, the code converter 542 of the arithmetic logic unit 546 executes preprocessing for converting, into a binary code, the Gray code corresponding to the D phase signal to determine the binary code BIN[0] of the least significant bit.

Then, during a period from time $t_{20}$ to time $t_{21}$, the code converter 542 reads out the Gray code corresponding to the D phase signal latched in the Gray code latch circuit 541, converts the Gray code into a binary code, and outputs the binary code to the full adder 543. At this time, the full adder 543 executes computation (addition/subtraction) processing on the binary code corresponding to the D phase signal and the binary code corresponding to the P phase signal, latched in the temporary latch circuit 544, and causes the IF latch circuit 545 to latch the result of the computation as the binary code of the pixel signal subjected to the CDS processing.

At time $t_{21}$ and later, the binary code of the pixel signal subjected to the CDS processing, which is latched in the IF latch circuit 545, is read out from the IF latch circuit 545 and output to the succeeding logic circuit.

In the known art described above, the Gray code latch circuits 541 and the code converters 542 are collectively disposed for each functional section, and an increased number of bits latched in the Gray code latch circuit 541 causes the data to be serially transferred from the Gray code latch circuit 541 to the code converter 542. On the other hand, a problem with an increased speed of the operation of the column processing section 13 is the clock frequency required for the serial transfer. A configuration for parallel processing of all bits is most effective in reducing the clock frequency. However, a problem with the configuration for parallel processing of all bits includes an increased number of wires for the column processing section 13 and an increased area of the column processing section 13.

2. Analog-to-Digital Converting Section in Embodiment of Present Technology

In the imaging element and the signal processing method for the imaging element in the embodiment of the present technology, the analog-to-digital converting section 50 takes a configuration described below, the analog-to-digital converting section 50 including the Gray code latch circuit 541, the code converter 542, the temporary latch circuit 544, and the full adder 543, which is an example of an arithmetic section. Specifically, the analog-to-digital converting section 50 is at least configured in such a manner that data transfer between the Gray code latch circuit 541 and the code converter 542 is processed in parallel a predetermined number of bits at a time to transfer an output from the code converter 542 to the full adder 543, which is an example of an arithmetic section, through data lines the number of which corresponds to the predetermined number of bits.

Parallel processing of the data transfer is not limited to the data transfer between the Gray code latch circuit 541 and the code converter 542. In addition to the data transfer between the Gray code latch circuit 541 and the code converter 542, data transfer between the code converter 542 and the temporary latch circuit 544 may be processed in parallel. Further, the following may also be processed in parallel: the data transfer between the Gray code latch circuit 541 and the code converter 542, data transfer between the code converter 542 and the temporary latch circuit 544, and data transfer between the temporary latch circuit 544 and the full adder 543.

By processing in parallel computation processing, which is serially executed in the known art, the number of serial transfer operations can be reduced to increase the speed of the operation of the column processing section 13 without the need to increase the number of wires for the column processing section 13 or the area of the column processing section 13. Additionally, simplified control enables a reduction in the power consumption of a circuit for clock transfer control, enabling both an increase in the speed of the operation of the column processing section 13 and a reduction in power consumption.

Now, specific examples of the analog-to-digital converting section 50 in the embodiment of the present technology will be described. In the description below, among the column counters 54_1 to 54_$n$ constituting the analog-to-digital converting section 50, the column counters for one pixel column are illustrated as the column counter 54 and will be described. Note that, hereinafter, the Gray code latch circuit may be labeled GCL, the code converter may be labeled C2B, the temporary latch circuit may be labeled WKL, the full adder may be labeled FA, and the IF latch circuit may be labeled RDL.

2-1. Example 1

Example 1 is an example in which the data transfer between the Gray code latch circuit 541 and the code converter 542 is processed in parallel. Example 1 assumes that the data transfer between the Gray code latch circuit 541 and the code converter 542 is processed in parallel two bits at a time. This also applies to examples described below. However, the number of bits for the data transfer is not limited to two bits.

Figure 10:
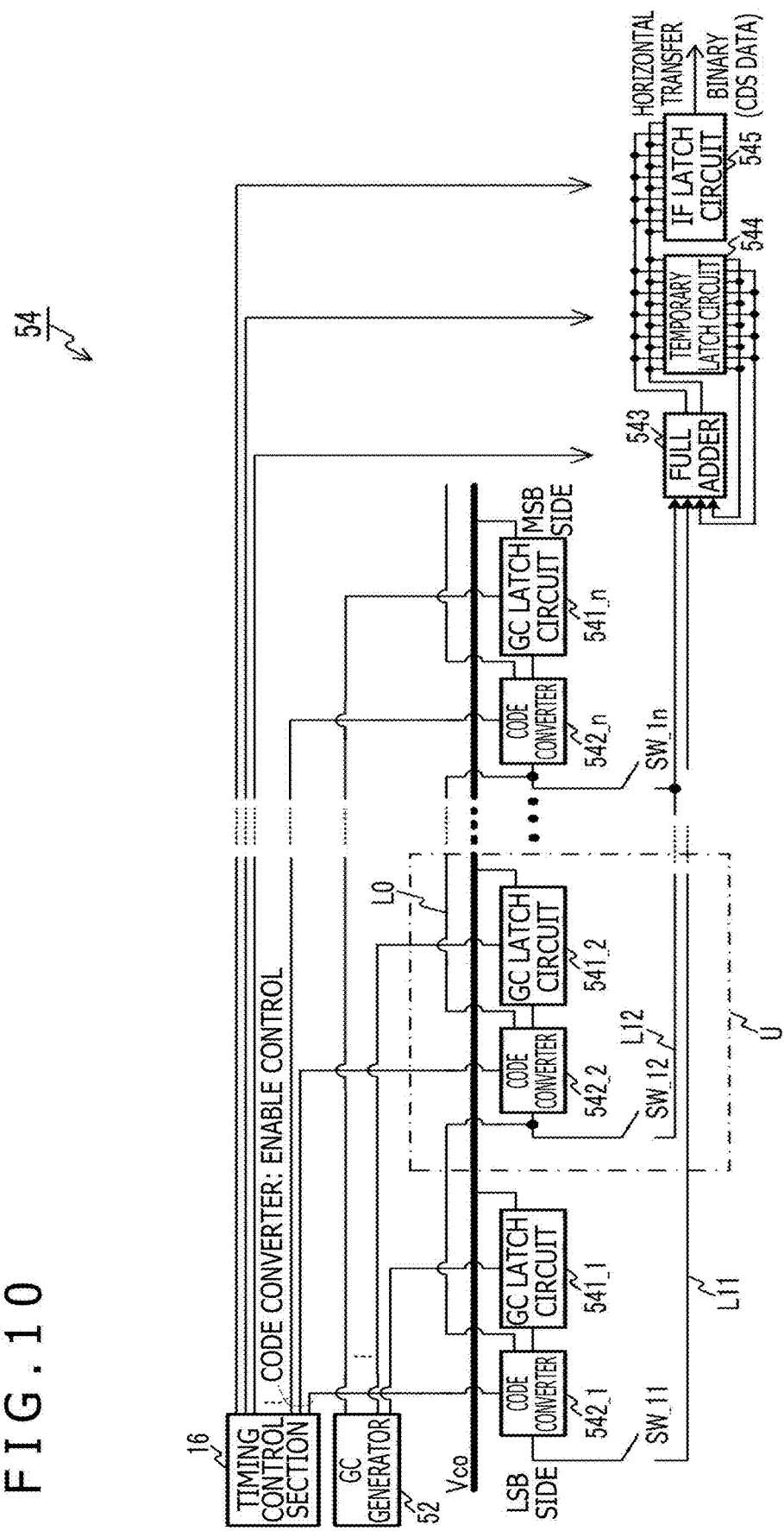
FIG. 10 is a block diagram illustrating a configuration example of a column counter according to Example 1.
Figure 11:
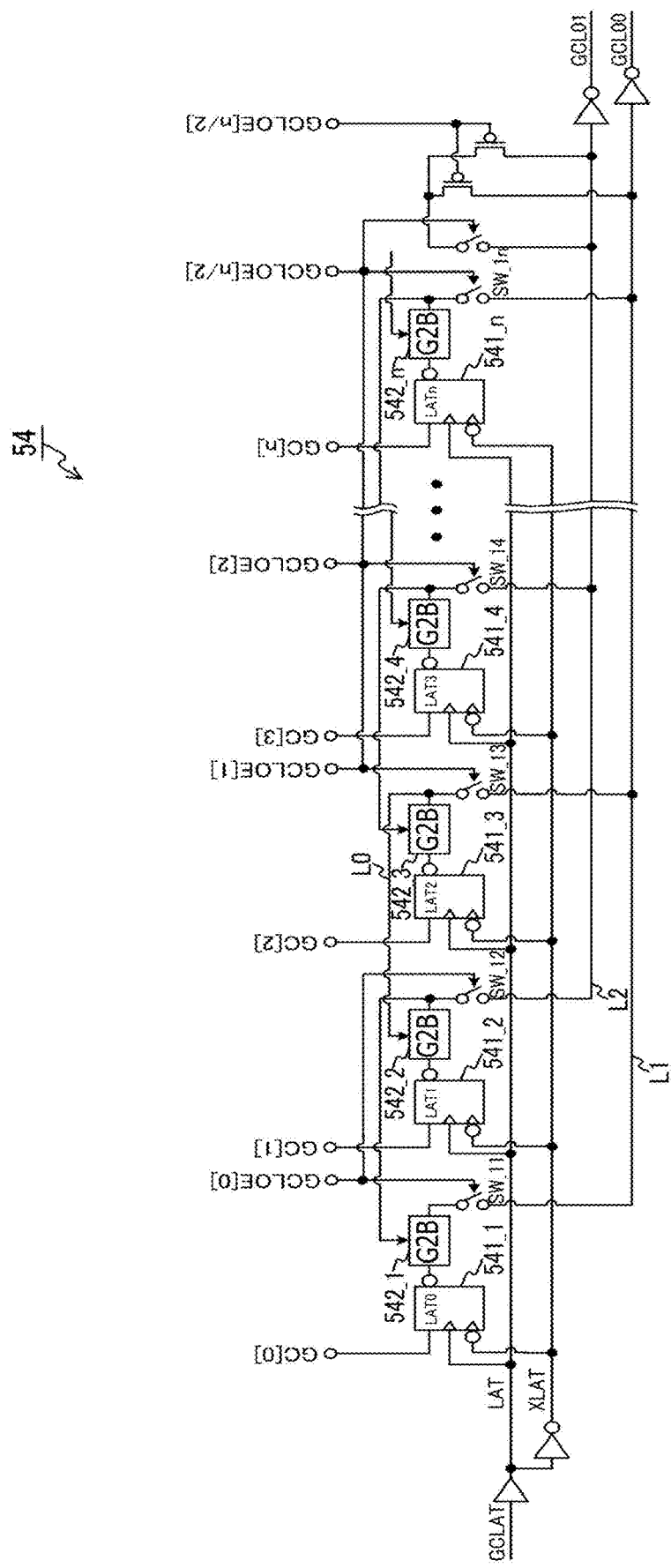
FIG. 11 is a circuit diagram illustrating an arrangement relation of a code converter with a Gray code latch circuit in the column counter according to Example 1.

FIG. 10 is a block diagram illustrating a configuration example of the column counter 54 according to Example 1. FIG. 11 is a circuit diagram illustrating an arrangement relation of the code converter 542 with the Gray code latch circuit 541 in the column counter 54 according to Example 1.

In the column counter 54 according to Example 1, the code converter 542 is disposed in parallel with the Gray code latch circuit 541 for each bit to process in parallel the data transfer between the Gray code latch circuit 541 and the code converter 542. In this manner, by disposing the code converter 542 in parallel with the Gray code latch circuit 541, the data transfer can be processed in parallel.

A signal is transmitted to the code converters 542_1 to 542_n from a most significant bit (MSB) side, and hence, when each of the code converters 542_1 to 542_n is disposed in parallel with a respective one of the Gray code latch circuits 541_1 to 541_n, the code converter is preferably located on a least significant bit (LSB) side of the Gray code latch circuit. In this manner, by disposing each of the code converters 542_1 to 542_n in parallel on the least significant bit side of a respective one of the Gray code latch circuits 541_1 to 541_n, the number of signal lines in the analog-to-digital converting section 50 need not be increased. Specifically, only one signal line L0 for parallel processing of the data transfer is additionally installed in the bit of each of the Gray code latch circuits 541_1 to 541_n.

The parallel arrangement of the Gray code latch circuits 541_1 to 541_n and the code converters 542_1 to 542_n includes a repetition of bit units U respectively including the Gray code latch circuit 541_1 and the code converter 542_1, the Gray code latch circuit 541_2 and the code converter 542_2, and so on. Then, configuring the bit units U as cells enables a reduction in the number of elements and in the area of the circuit. Here, configuring the bit units U as cells refers to configuring each bit unit U as a circuit pattern constituting the minimum unit. This also applies to the examples described below.

An output from each of the code converters 542_1 to 542_n is read out, using a respective one of switches SW_11 to SW_1n, two bits at a time, on two data lines L11 and L12, which then transfer the output to the full adder 543.

FIG. 12 illustrates a circuit example of each of the code converters 542_1 to 542_n. Each of the code converters 542_1 to 542_n includes an XOR circuit (exclusive OR circuit). Each of the code converters 542_1 to 542_n is disposed laterally to a respective one of the Gray code latch circuits 541_1 to 541_n for integration, and hence, the XOR circuit is assumed to include a differential input. Thus, for the code converters 542_1 to 542_n in FIG. 11, the total number of transistors for the respective bits can be reduced down to 6, including transistors Tr1 to Tr4 and two transistors constituting an inverter 501, as illustrated in "a" in FIG. 12.

Additionally, even in a case where enable (EN) control is added in order to allow signal detection and to reduce the peak of an operating current for the code converters 542_1 to 542_n, the total number of transistors for the respective bits can be reduced down to 8, including transistors Tr1 to Tr4 and four transistors constituting a NAND circuit 502, as illustrated in "b" in FIG. 12.

In the configuration in which each of the code converters 542_1 to 542_n is disposed in parallel on the least significant bit side of a respective one of the Gray code latch circuits 541_1 to 541_n, the XOR circuit constituting each of the code converters 542_1 to 542_n directly receives a differential input from the respective one of the Gray code latch circuits 541_1 to 541_n and is thus subjected to a reduced load. As a result, the number of elements constituting the XOR circuit can be reduced, and the transistors can be miniaturized, enabling a reduction in the circuit scale of the XOR circuit.

Figure 13:
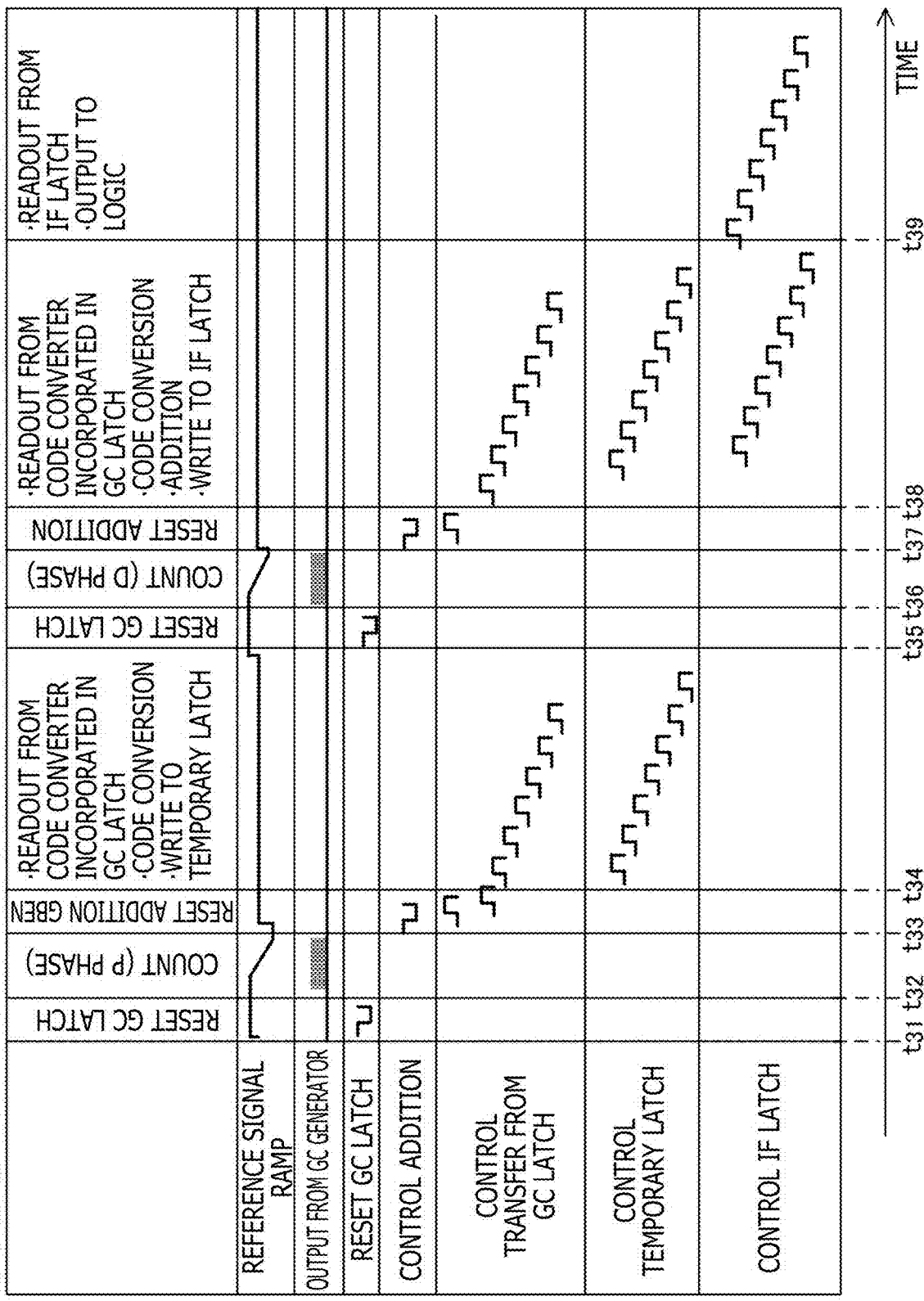
FIG. 13 is a timing chart for describing an operation processing example of the column counter according to Example 1.

Now, with reference to FIG. 13, an operation processing example of the column counter 54 according to Example 1 will be described. FIG. 13 is a timing chart for describing the operation processing example of the column counter 54 according to Example 1. The operation processing of the column counters 54 described below is assumed to be executed under the control of the timing control section 16. This also applies to the examples described below.

During a period from time $t_{31}$ to time $t_{32}$, the Gray code (GC) latch circuit 541 is reset and initialized. That is, in the processing during this period, reception of the Gray code corresponding to the P phase signal is prepared for.

Then, during a period from time $t_{32}$ to time $t_{33}$, the Gray code generator 52 outputs a Gray code (GC), which is latched in the Gray code latch circuit 541. This processing is executed, for example, during a period when the ramp wave of the reference signal RAMP varies at a predetermined rate. More particularly, with the reference signal RAMP varying at the predetermined rate, at the timing when the comparators 53_1 to 53_n (see FIG. 3) detect that the reference signal RAMP is greater than the pixel signal Vsig, the Gray code fed from the Gray code generator 52 is latched as the Gray code corresponding to the P phase signal.

Then, during a period from time $t_{33}$ to time $t_{34}$, the full adder 543 is reset (addition reset), and then during a period from time t34 to time t35, the code converter 542 incorporated in the Gray code latch circuit 541 reads out the Gray code corresponding to the P phase signal, latched in the Gray code latch circuit 541, converts the Gray code into a binary code, and outputs the binary code to the full adder 543. At this time, the full adder 543 executes computation (addition/subtraction) processing on the binary code of the P phase signal, and the predetermined binary code latched in the temporary latch circuit 544, specifically, the binary code with bits all being zero, and the temporary latch circuit 544 latches the result of the computation.

Then, during a period from time $t_{35}$ to time $t_{36}$, the Gray code latch circuit 541 is reset and initialized. That is, in the processing during this period, reception of the Gray code corresponding to the D phase signal is prepared for.

Then, during a period from time $t_{36}$ to time $t_{37}$, the Gray code generator 52 outputs a Gray code, which is latched in the Gray code latch circuit 541. This processing is executed, for example, during a period when the ramp wave of the reference signal RAMP varies at a predetermined rate. More particularly, with the ramp wave of the reference signal RAMP varying, at the timing when the comparators 53_1 to 53_n (see FIG. 3) detect that the reference signal RAMP is greater than the pixel signal Vsig, the Gray code fed from the Gray code generator 52 is latched as the Gray code corresponding to the D phase signal.

Then, during a period from time $t_{37}$ to time $t_{38}$, the full adder 543 is reset (addition reset), and then during a period from time $t_{38}$ to time $t_{39}$, the code converter 542 incorporated in the Gray code latch circuit 541 reads out the Gray code corresponding to the D phase signal, latched in the Gray code latch circuit 541, converts the Gray code into a binary code, and outputs the binary code to the full adder 543. At this time, the full adder 543 executes computation (addition/subtraction) processing on the binary code corresponding to the D phase signal and the binary code that is latched in the temporary latch circuit 544 and that corresponds to the P phase signal, and causes the IF latch circuit 545 to latch the result of the computation as the binary code of the pixel signal subjected to the CDS processing.

At time $t_{39}$ and later, the binary code of the pixel signal subjected to the CDS processing, which is latched in the IF latch circuit 545, is read out from the IF latch circuit 545 and output to the succeeding logic circuit.

2-2. Example 2

Example 2 is a variation of Example 1 in which the data transfer between the Gray code latch circuit 541 and the code converter 542 is processed in parallel.

Figure 14:
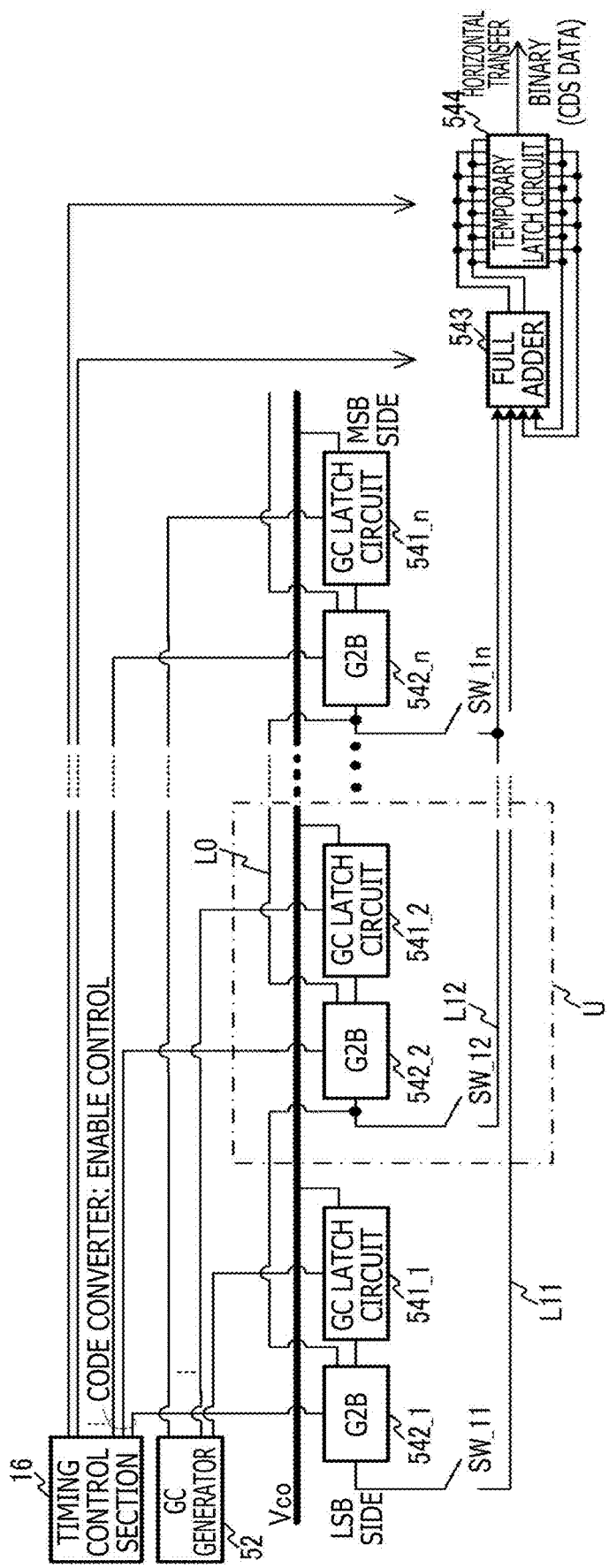
FIG. 14 is a block diagram illustrating a configuration example of a column counter according to Example 2.

FIG. 14 is a block diagram illustrating a configuration example of the column counter 54 according to Example 2. The column counter 54 according to Example 2 corresponds to the column counter 54 according to Example 1 from which the IF latch circuit 545 is omitted. The data transfer between the Gray code latch circuit 541 and the code converter 542 is processed in parallel, thus enabling the IF latch circuit 545 to be omitted. Further, omission of the IF latch circuit 545 allows the configuration of the column counter 54 to be simplified to a degree corresponding to the omission. The omission of the IF latch circuit 545 also applies to the examples described below.

Figure 15:
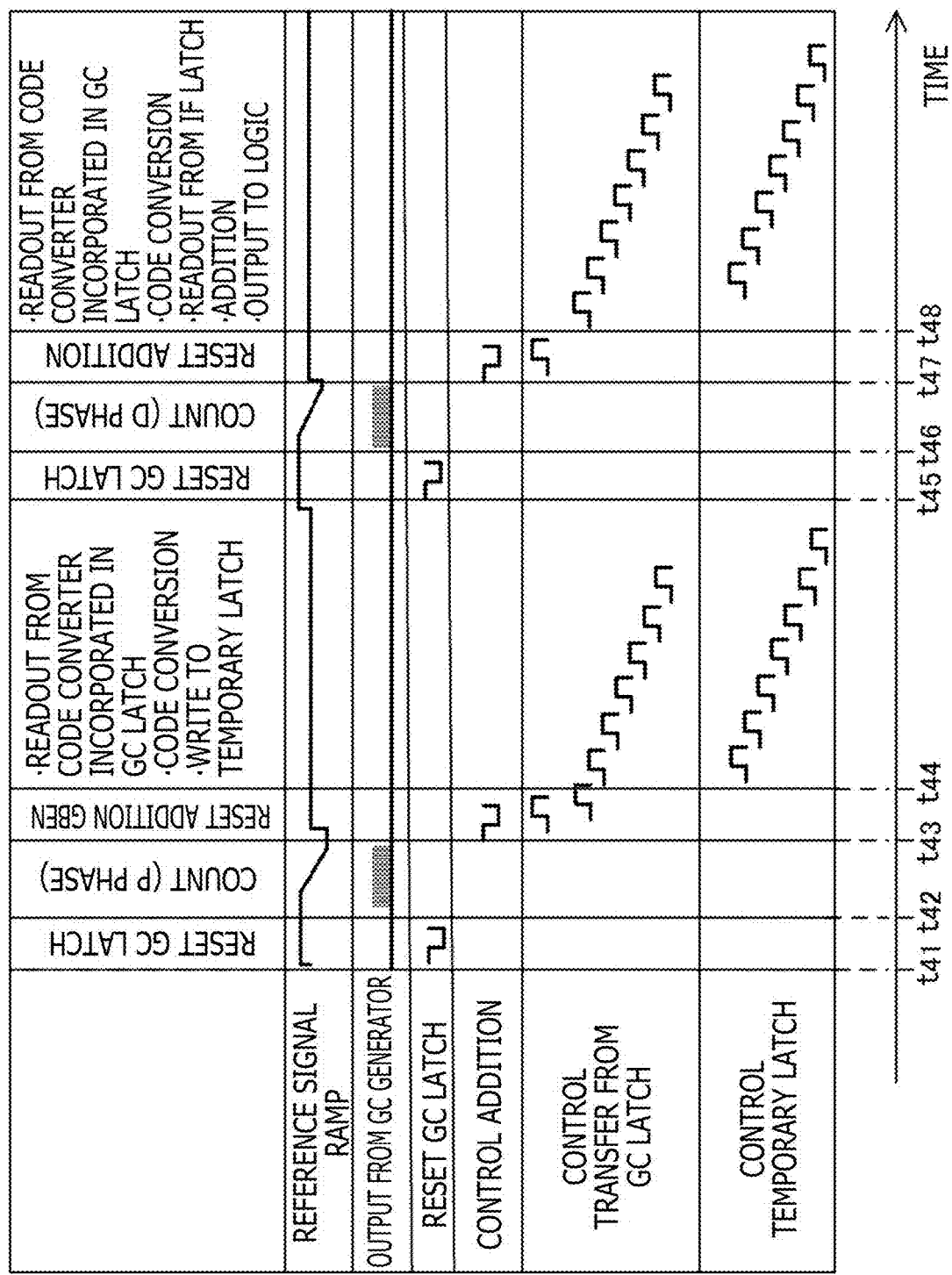
FIG. 15 is a timing chart for describing an operation processing example of the column counter according to Example 2.

Now, with reference to FIG. 15, an operation processing example of the column counter 54 according to Example 2 will be described. FIG. 15 is a timing chart for describing the operation processing example of the column counter 54 according to Example 2.

During a period from time $t_{41}$ to time $t_{42}$, the Gray code (GC) latch circuit 541 is reset and initialized. That is, in the processing during this period, reception of the Gray code corresponding to the P phase signal is prepared for.

Then, during a period from time to $t_{42}$ time $t_{43}$, the Gray code generator 52 outputs a Gray code (GC), which is latched in the Gray code latch circuit 541. This processing is executed, for example, during a period when the ramp wave of the reference signal RAMP varies at a predetermined rate. More particularly, with the reference signal RAMP varying at the predetermined rate, at the timing when the comparators 53_1 to 53_n (see FIG. 3) detect that the reference signal RAMP is greater than the pixel signal Vsig, the Gray code fed from the Gray code generator 52 is latched as the Gray code corresponding to the P phase signal.

Then, during a period from time $t_{43}$ to time $t_{44}$, the full adder 543 is reset (addition reset), and then during a period from time $t_{44}$ to time $t_{45}$, the code converter 542 incorporated in the Gray code latch circuit 541 reads out the Gray code corresponding to the P phase signal, latched in the Gray code latch circuit 541, converts the Gray code into a binary code, and outputs the binary code to the full adder 543. At this time, the full adder 543 executes computation (addition/subtraction) processing on the binary code of the P phase signal, and the binary code with bits all being zero, latched in the temporary latch circuit 544, and causes the temporary latch circuit 544 to latch the result of the computation.

Then, during a period from time $t_{45}$ to time $t_{46}$, the Gray code latch circuit 541 is reset and initialized. That is, in the processing during this period, reception of the Gray code corresponding to the D phase signal is prepared for.

Then, during a period from time $t_{46}$ to time $t_{47}$, the Gray code generator 52 outputs a Gray code, which is latched in the Gray code latch circuit 541. This processing is executed, for example, during a period when the ramp wave of the reference signal RAMP varies at a predetermined rate. More particularly, with the ramp wave of the reference signal RAMP varying, at the timing when the comparators 53_1 to 53_n (see FIG. 3) detect that the reference signal RAMP is greater than the pixel signal Vsig, the Gray code fed from the Gray code generator 52 is latched as the Gray code corresponding to the D phase signal.

Subsequently, during a period from time tar to time $t_{48}$, the full adder 543 is reset (addition reset). Then, at time $t_{48}$ and later, the code converter 542 incorporated in the Gray code latch circuit 541 reads out the Gray code corresponding to the D phase signal, latched in the Gray code latch circuit 541, converts the Gray code into a binary code, and outputs the binary code to the full adder 543. At this time, the full adder 543 executes computation (addition/subtraction) processing on the binary code corresponding to the D phase signal, and the binary code corresponding to the P phase signal, latched in the temporary latch circuit 544, and the result of the computation is output to the succeeding logic circuit as the binary code of the pixel signal subjected to the CDS processing.

2-3. Example 3

Example 3 is an example in which the data transfer between the Gray code latch circuit 541 and the code converter 542 and the data transfer between the code converter 542 and the temporary latch circuit 544 are processed in parallel.

Figure 16:
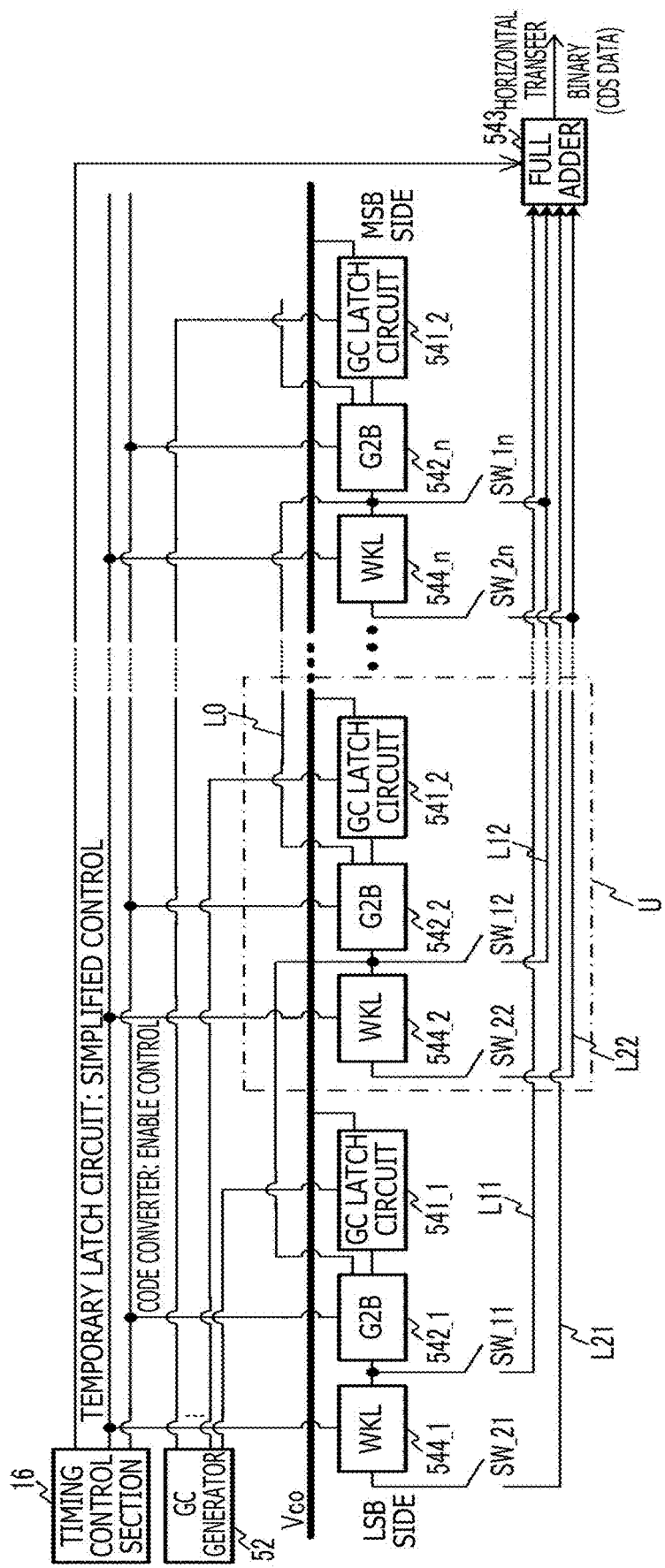
FIG. 16 is a block diagram illustrating a configuration example of a column counter according to Example 3.

FIG. 16 is a block diagram illustrating a configuration example of the column counter 54 according to Example 3. In the column counter 54 according to Example 3, in addition to the data transfer between the Gray code latch circuit 541 and the code converter 542, the data transfer between the code converter 542 and the temporary latch circuit 544 is processed in parallel. This further enables a reduction in the number of serial transfer operations, simplification of the configuration of the serial transfer system, and an increase in the speed of the operation of the column processing section 13. Specifically, the column counter 54 is configured in such a manner that, for each bit, the code converter 542 is disposed in parallel with the Gray code latch circuit 541 as in Example 1, and is further configured in such a manner that, for each bit, the temporary latch circuit 544 is disposed in parallel with and laterally to the code converter 542. This is further effective in allowing the configuration of the serial transfer system to be simplified.

More particularly, each of the code converters 542_1 to 542_n is disposed in parallel with and on the least significant bit (LSB) side of a respective one of the Gray code latch circuits 541_1 to 541_n, and each of the temporary latch circuits 544_1 to 544_n is disposed in parallel with and laterally to the respective one of the code converters 542_1 to 542_n. An output from each of the temporary latch circuits 544_1 to 544_n is read out, using a respective one of switches SW_21 to SW_2n, two bits at a time, on two data lines L21 and L22, which then transfer the output to the full adder 543.

That is, the column counter 54 according to Example 3 includes two additional data lines L21 and L22 in addition to the signal line L0 and the two data lines L11 and L12 for parallel processing of the data transfer. The two data lines (first data lines) L11 and L12 are used to transfer the output from each of the code converters 542_1 to 542_n to the full adder 543 two bits at a time. The two data lines (second data lines) L21 and L22, in addition to the two data lines L11 and L12, are used to transfer the output from each of the temporary latch circuits 544_1 to 544_n to the full adder 543 two bits at a time.

The column counter 54 according to Example 3 includes a repetition of bit units U respectively including the Gray code latch circuit 541_1, the code converter 542_1, and the temporary latch circuit 544_1; the Gray code latch circuit 541_2, the code converter 542_2, and the temporary latch circuit 544_2; and so on. Further, configuring the bit units U as cells enables a reduction in the number of elements constituting the circuit and in the area of the circuit.

Figure 17:
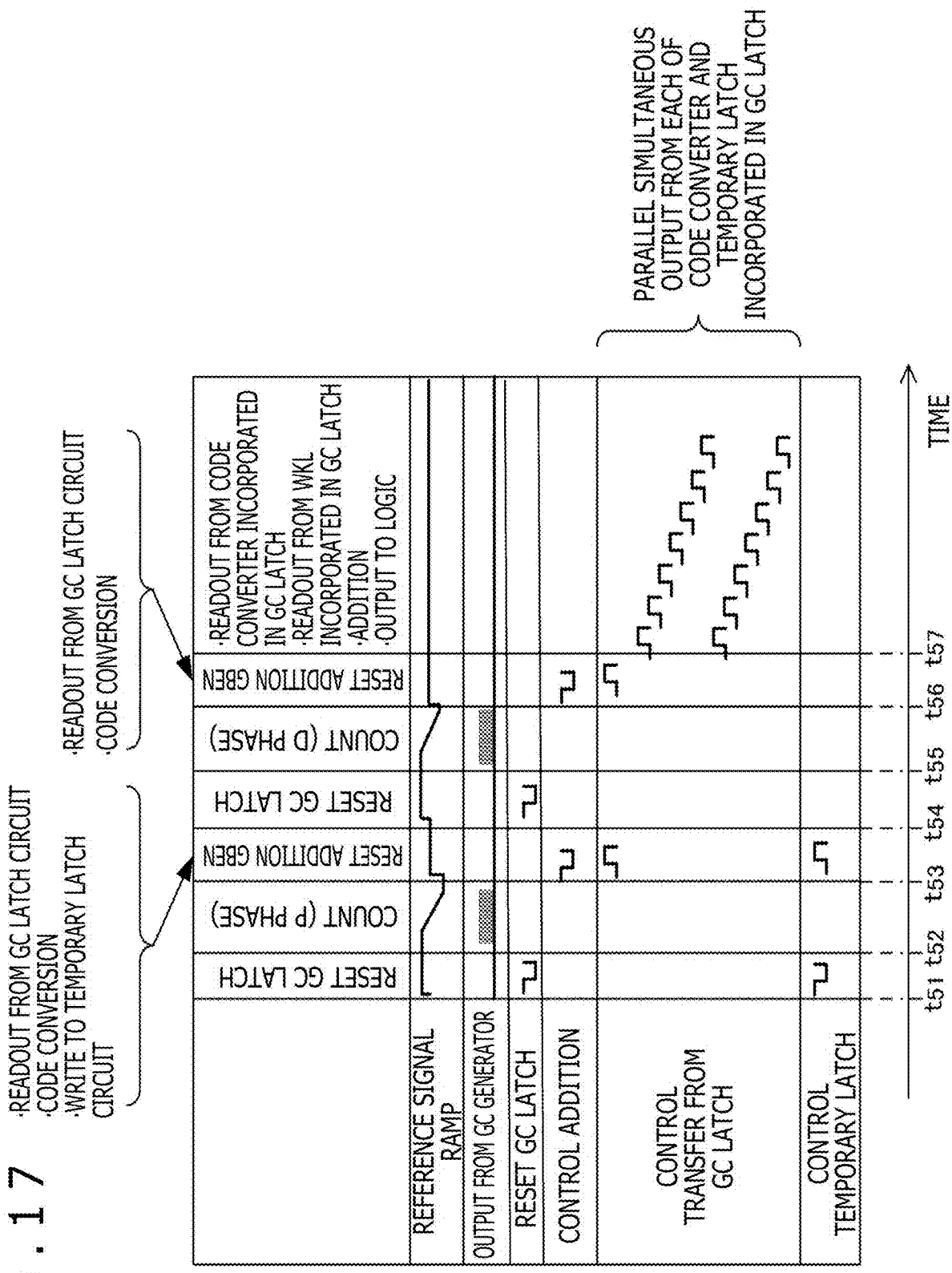
FIG. 17 is a timing chart for describing an operation processing example of the column counter according to Example 3.

Now, with reference to FIG. 17, an operation processing example of the column counter 54 according to Example 3 will be described. FIG. 17 is a timing chart for describing the operation processing example of the column counter 54 according to Example 3.

During a period from time $t_{51}$ to time $t_{52}$, the Gray code (GC) latch circuit 541 is reset and initialized. That is, in the processing during this period, reception of the Gray code corresponding to the P phase signal is prepared for.

Then, during a period from time $t_{52}$ to time $t_{53}$, the Gray code generator 52 outputs a Gray code (GC), which is latched in the Gray code latch circuit 541. This processing is executed, for example, during a period when the ramp wave of the reference signal RAMP varies at a predetermined rate. More particularly, with the reference signal RAMP varying at the predetermined rate, at the timing when the comparators 53_1 to 53_n (see FIG. 3) detect that the reference signal RAMP is greater than the pixel signal Vsig, the Gray code fed from the Gray code generator 52 is latched as the Gray code corresponding to the P phase signal.

Then, during a period from time $t_{53}$ to time $t_{54}$, the full adder 543 is subjected to addition reset. During this period, processing is further executed in which the Gray code corresponding to the P phase signal, latched in the Gray code latch circuit 541, is read out, converted into a binary code, and then output to the full adder 543. At this time, the full adder 543 executes computation (addition/subtraction) processing on the binary code of the P phase signal, and the binary code with bits all being zero, latched in the temporary latch circuit 544, and causes the temporary latch circuit 544 to latch the result of the computation.

Then, during a period from time $t_{54}$ to time $t_{55}$, the Gray code latch circuit 541 is reset and initialized. That is, in the processing during this period, reception of the Gray code corresponding to the D phase signal is prepared for.

Then, during a period from time $t_{55}$ to time $t_{56}$, the Gray code generator 52 outputs a Gray code, which is latched in the Gray code latch circuit 541. This processing is executed, for example, during a period when the ramp wave of the reference signal RAMP varies at a predetermined rate. More particularly, with the ramp wave of the reference signal RAMP varying, at the timing when the comparators 53_1 to 53_n (see FIG. 3) detect that the reference signal RAMP is greater than the pixel signal Vsig, the Gray code fed from the Gray code generator 52 is latched as the Gray code corresponding to the D phase signal.

Then, during a period from time $t_{56}$ to time $t_{57}$, the full adder 543 is subjected to addition reset. During this period, processing is further executed in which the Gray code corresponding to the D phase signal, latched in the Gray code latch circuit 541, is read out and converted into a binary code.

At time $t_{57}$ and later, the binary code corresponding to the D phase signal is read out from the code converter 542 incorporated in the Gray code latch circuit 541, and the binary code corresponding to the P phase signal, which is latched in the temporary latch circuit (WKL) 544 incorporated in the Gray code latch circuit 541, is read out. Then, computation (addition/subtraction) is performed on the binary code corresponding to the D phase signal and the binary code corresponding to the P phase signal, and the result of the computation is output to the succeeding logic circuit as the binary code of the pixel signal subjected to the CDS processing.

(Temporary Latch Circuit)

Figure 18:
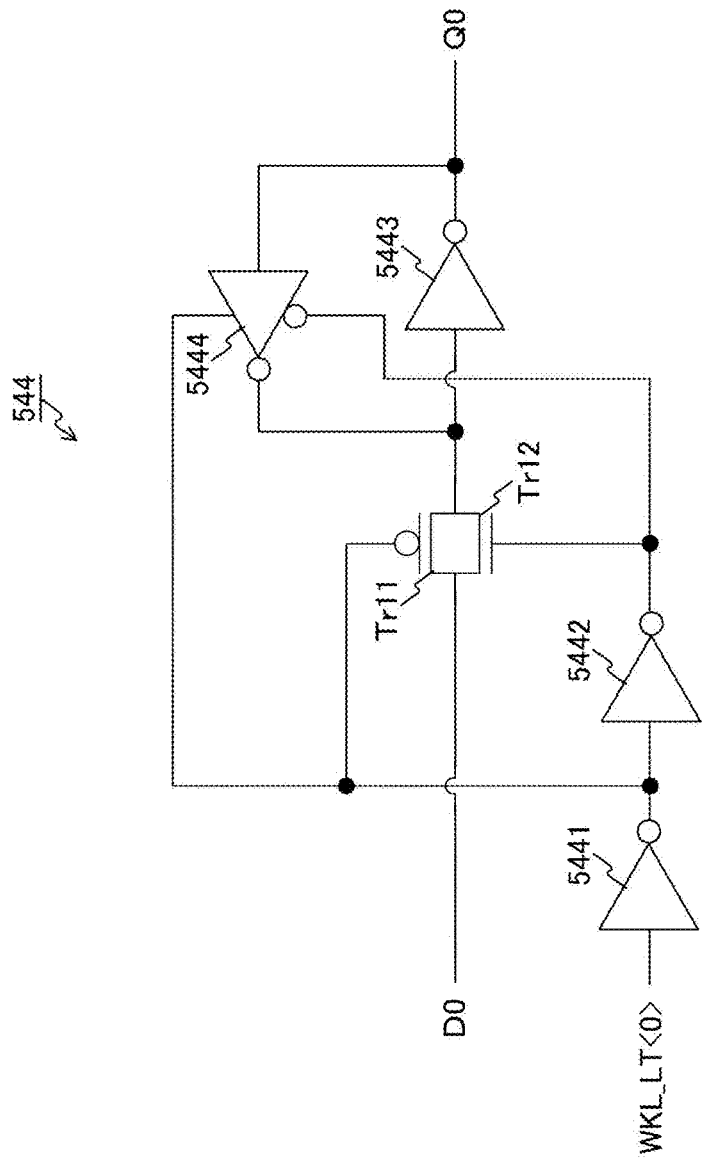
FIG. 18 is a circuit diagram illustrating a configuration example of a temporary latch circuit.

FIG. 18 is a circuit diagram illustrating a configuration example of the temporary latch circuit 544 (544_1 to 544_n).

The temporary latch circuit 544 has a circuit configuration including two inverter circuits 5441 and 5442 connected in series with each other, two inverter circuits 5443 and 5444 connected in parallel with each other, and a P channel MOS transistor Tr11 and an N channel MOS transistor Tr12 connected in parallel with each other. The inverter circuit 544 that is a NOT circuit, the P channel MOS transistor Tr11, and the N channel MOS transistor Tr12 constitute a CMOS transfer gate circuit. Here, WKL_LT<0> is a control signal provided by the timing control section 16. This parallel configuration enables all bits to be simultaneously controlled. In this case, 13 control signal lines WKL_LT<0> to WKL_LT<12> can be bundled into one control signal line WKL_LT. Additionally, the number of signal lines and control power can be reduced.

(Full Adder)

Figure 19:
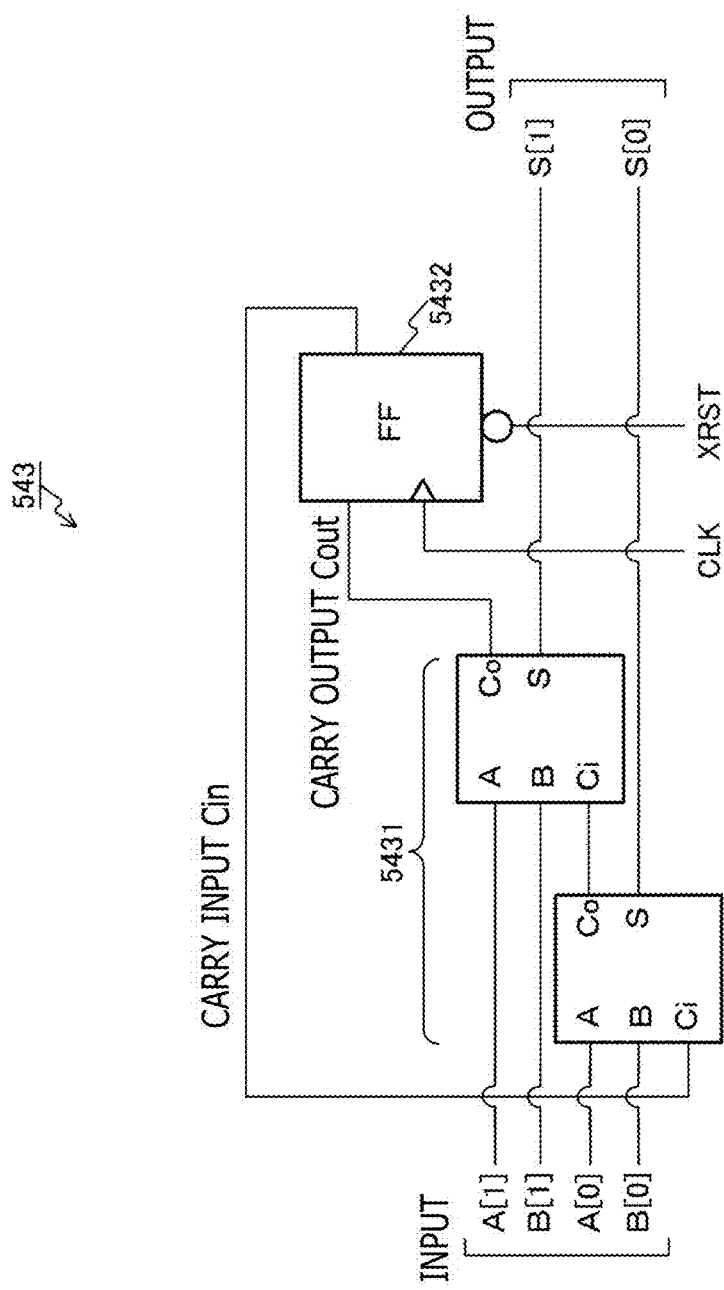
FIG. 19 is a circuit diagram illustrating a configuration example of a full adder.

FIG. 19 is a circuit diagram illustrating a configuration example of the full adder 543.

The full adder 543 has a 2-bit full adder configuration including an arithmetic circuit 5431 for the number of bits of a bus and a flip flop (FF) 5432 that uses a carry output Cout of the arithmetic circuit 5431 as an input and a transfer clock CLK as a clock input.

Compared to a configuration in which the Gray code latch circuit 541 does not incorporate the temporary latch circuit 544, the full adder 543 with the circuit configuration described above includes two additional data lines (L21 and L22) that transfer code data output from the temporary latch circuits 544_1 to 544_n.

2-4. Example 4

Example 4 is an example in which the following are processed in parallel: the data transfer between the Gray code latch circuit 541 and the code converter 542, the data transfer between the code converter 542 and the temporary latch circuit 544, and the data transfer between the temporary latch circuit 544 and the full adder 543 that is an example of the arithmetic section.

Figure 20:
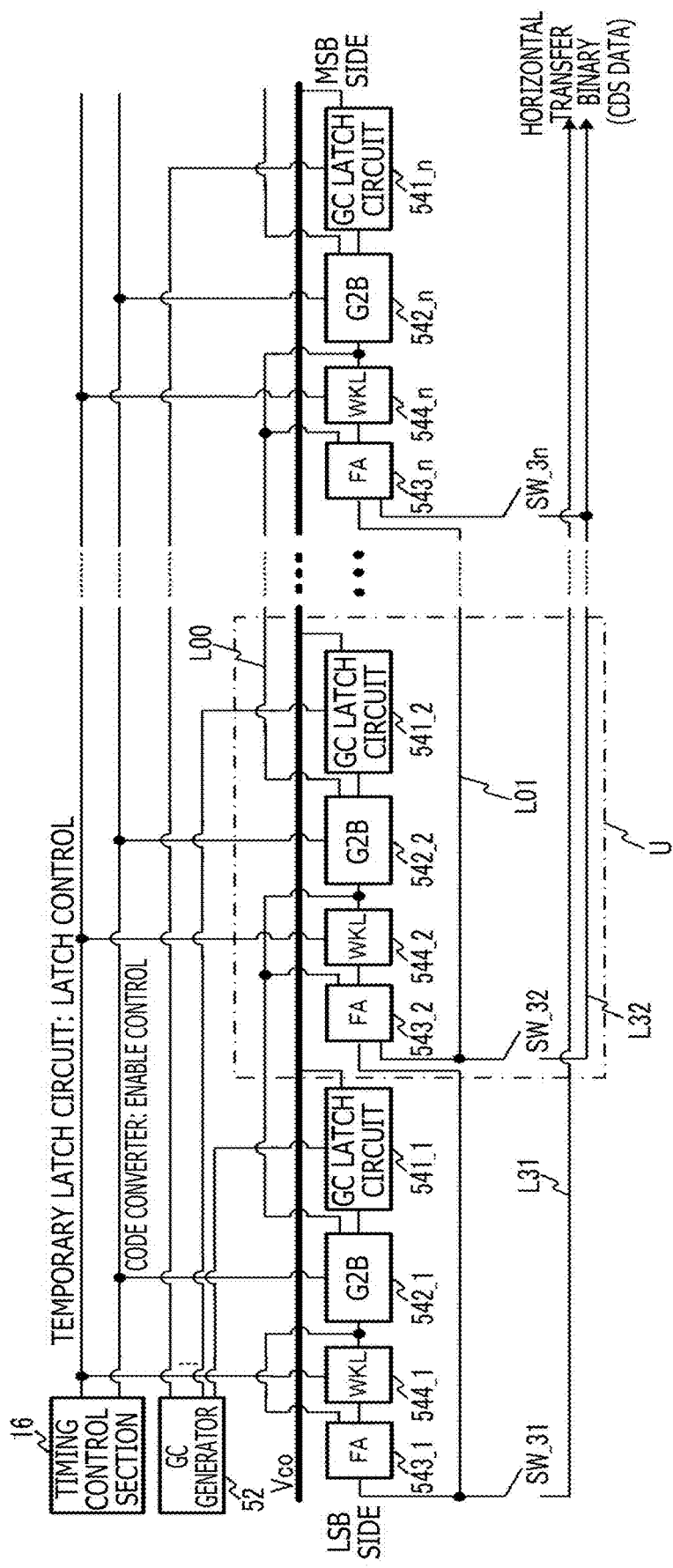
FIG. 20 is a block diagram illustrating a configuration example of a column counter according to Example 4.

FIG. 20 is a block diagram illustrating a configuration example of the column counter 54 according to Example 4. The column counter 54 according to Example 4 corresponds to the column counter 54 according to Example 3 in which the data transfer between the temporary latch circuit 544 and the full adder 543 is further processed in parallel. Specifically, the column counter 54 is configured in such a manner that, for each bit, the code converter 542 and the temporary latch circuit 544 are disposed in parallel with the Gray code latch circuit 541 as in Example 3, and is further configured in such a manner that, for each bit, the full adder 543 is disposed in parallel with and laterally to the temporary latch circuit 544. This further enables a reduction in the number of serial transfer operations, simplification of the configuration of the serial transfer system, and an increase in the speed of the operation of the column processing section 54.

More particularly, each of the code converters 542_1 to 542_n is disposed in parallel with and laterally to a respective one of the Gray code latch circuits 541_1 to 541_n, each of the temporary latch circuits (WKL) 544_1 to 544_n is disposed in parallel with and laterally to a respective one of the code converters 542_1 to 542_n, and each of the full adders (FA) 543_1 to 543_n is disposed in parallel with and laterally to a respective one of the temporary latch circuits 544_1 to 544_n. The output from each of the temporary latch circuits 544_1 to 544_n is read out, using a respective one of switches SW_31 to SW_3n, two bits at a time, on two data lines L31 and L32, which then transfer the output to the full adder 543.

The column counter 54 according to Example 4 includes an additional signal line L01 for the carry signal for each of the full adders 543_1 to 543_n, in addition to a signal line L00 for parallel processing of the data transfer.

The column counter 54 according to Example 4 includes a repetition of bit units U respectively including the Gray code latch circuit 541_1, the code converter 542_1, the temporary latch circuit 544_1, and the full adder 543_1; the Gray code latch circuit 541_2, the code converter 542_2, the temporary latch circuit 544_2, and the full adder 543_2; and so on. Further, configuring the bit units U as cells enables a reduction in the number of elements constituting the circuit and in the area of the circuit.

Figure 21:
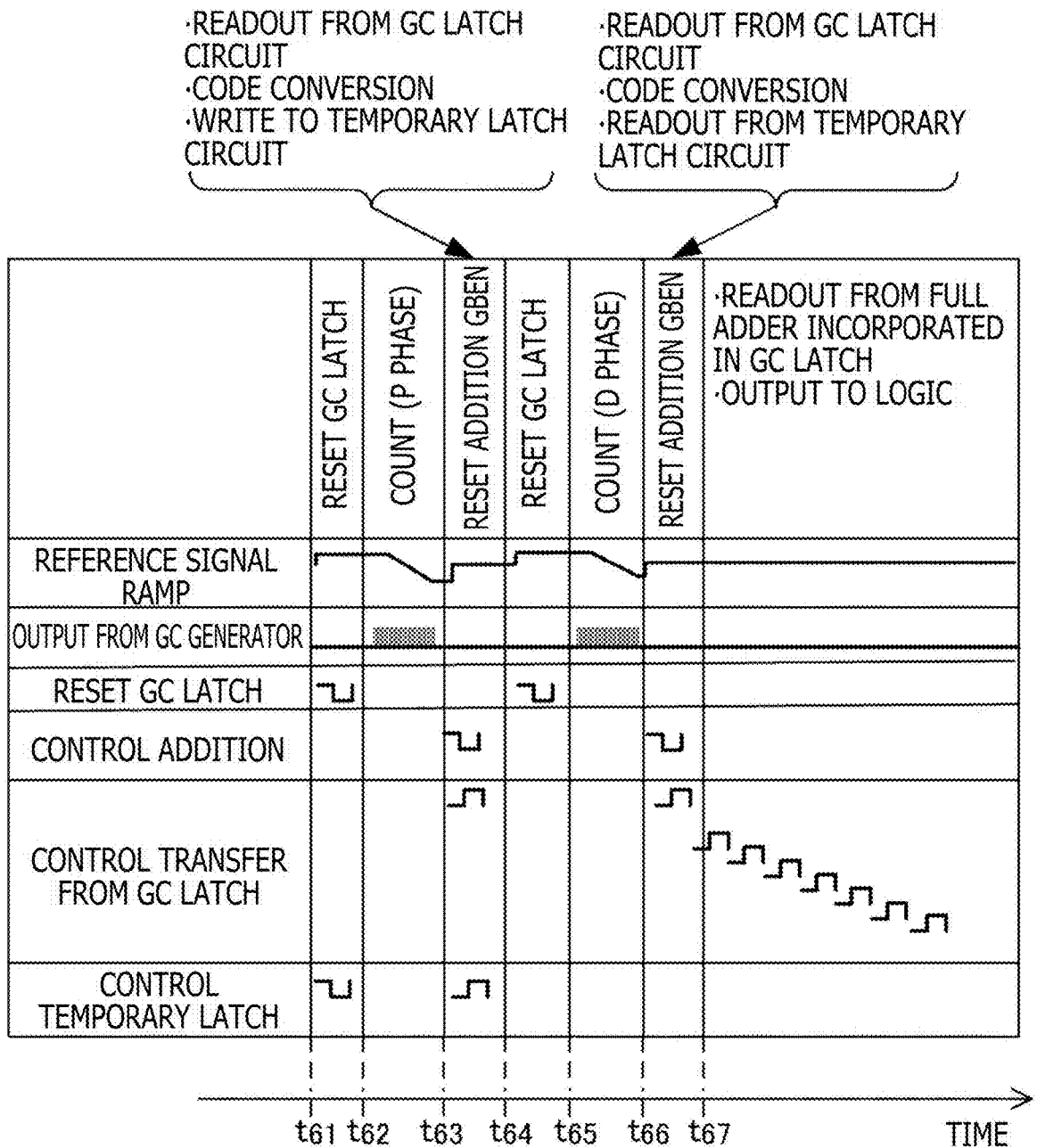
FIG. 21 is a timing chart for describing an operation processing example of the column counter according to Example 4.

Now, with reference to FIG. 21, an operation processing example of the column counter 54 according to Example 4 will be described. FIG. 21 is a timing chart for describing the operation processing example of the column counter 54 according to Example 4.

During a period from time $t_{61}$ to time $t_{62}$, the Gray code (GC) latch circuit 541 is reset and initialized. That is, in the processing during this period, reception of the Gray code corresponding to the P phase signal is prepared for.

Then, during a period from time $t_{62}$ to time $t_{63}$, the Gray code generator 52 outputs a Gray code (GC), which is latched in the Gray code latch circuit 541. This processing is executed, for example, during a period when the ramp wave of the reference signal RAMP varies at a predetermined rate. More particularly, with the reference signal RAMP varying at the predetermined rate, at the timing when the comparators 53_1 to 53_n (see FIG. 3) detect that the reference signal RAMP is greater than the pixel signal Vsig, the Gray code fed from the Gray code generator 52 is latched as the Gray code corresponding to the P phase signal.

Then, during a period from time $t_{63}$ to time $t_{64}$, the full adder 543 incorporated in the Gray code latch circuit 541 is subjected to addition reset. During this period, processing is further executed in which the Gray code corresponding to the P phase signal, latched in the Gray code latch circuit 541, is read out, converted into a binary code, and then output to the full adder 543. At this time, the full adder 543 executes computation (addition/subtraction) processing on the binary code of the P phase signal, and the binary code with bits all being zero, latched in the temporary latch circuit 544, and causes the temporary latch circuit 544 to latch the result of the computation.

Then, during a period from time to $t_{64}$ time $t_{65}$, the Gray code latch circuit 541 is reset and initialized. That is, in the processing during this period, reception of the Gray code corresponding to the D phase signal is prepared for.

Then, during a period from time $t_{65}$ to time $t_{66}$, the Gray code generator 52 outputs a Gray code, which is latched in the Gray code latch circuit 541. This processing is executed, for example, during a period when the ramp wave of the reference signal RAMP varies at a predetermined rate. More particularly, with the ramp wave of the reference signal RAMP varying, at the timing when the comparators 53_1 to 53_n (see FIG. 3) detect that the reference signal RAMP is greater than the pixel signal Vsig, the Gray code fed from the Gray code generator 52 is latched as the Gray code corresponding to the D phase signal.

Then, during a period from time $t_{66}$ to time $t_{67}$, the full adder 543 incorporated in the Gray code latch circuit 541 is subjected to addition reset. During this period, the binary code corresponding to the D phase signal is read out from the code converter 542 incorporated in the Gray code latch circuit 541, and the binary code corresponding to the P phase signal, which is latched in the temporary latch circuit (WKL) 544 incorporated in the Gray code latch circuit 541, is read out. Then, computation (addition/subtraction) is performed on the binary code corresponding to the D phase signal and the binary code corresponding to the P phase signal.

At time $t_{67}$ and later, the result of the computation is read out from the full adder 543 incorporated in the Gray code latch circuit 541, and output to the succeeding logic circuit as the binary code of the pixel signal subjected to the CDS processing.

(Full Adder)

Figure 22:
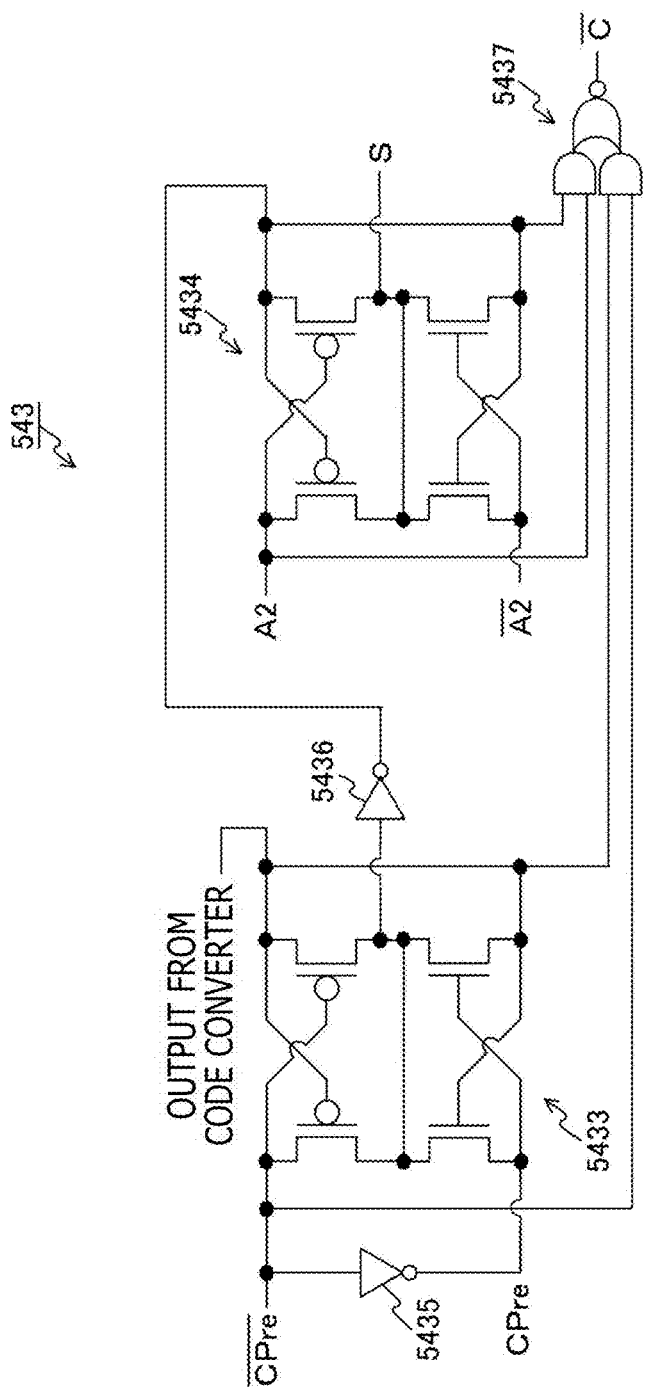
FIG. 22 is a circuit diagram illustrating a configuration example of the full adder.

FIG. 22 is a circuit diagram illustrating a configuration example of the full adder 543.

The full adder 543 includes two XOR circuits (exclusive OR circuits) 5433 and 5434 each with a 4-transistor configuration, an inverter circuit 5435 provided at an input of the XOR circuit 5433, an inverter circuit 5436 provided between the two XOR circuits 5433 and 5434, and an output gate circuit 5437. The output gate circuit 5437 includes a combination of two AND circuits and one NOR circuit.

The column counter 54 according to Example 4 includes sets of the Gray code latch circuit 541, the code converter 542, the temporary latch circuit 544, and the full adder 543 disposed in parallel with one another for the respective bits of the Gray code. CPre in FIG. 22 denotes a carry from the full adders 543 in the sets for the lower-order bits. The carry CPre corresponding to all P phase signals is input to the adder 543 as an inversion signal.

The full adder 543 according to the present configuration example is configured to output the carry signal C from the output gate circuit 5437 as an inversion signal. This allows signal output to external cells to be stabilized without the need to increase the number of elements constituting the full adder 543. In a case where the carry signal C is output as an inversion signal, then at the succeeding stage, the inverter circuit receives the inversion signal of the carry signal C.

2-5. Comparison Between Known Example and Each Example of Present Technology

Here, a known example is compared with each example of the present technology in terms of the control clock frequency required in a case where processing is executed two bits at a time, and the like. As is apparent from a comparison between the timing chart of the known example illustrated in FIG. 9 and the timing charts of the examples of the present technology in FIG. 13, FIG. 15, FIG. 17, and FIG. 21, the data transfer can more advantageously be processed in parallel with respect to the known serial transfer.

FIG. 23 is a diagram illustrating an example in which the known example is compared with each example of the present technology in terms of the control clock frequency and the like. Illustrated here are the effect of parallel processing on the circuit scale (size), which is estimated in terms of the number of transistors, and the control clock frequency, which is estimated in terms of the number of data transfers. Comparison of the circuit scale is based on a circuit configuration in which circuit blocks in the known example illustrated in FIG. 4 are constructed using normal logical gates.

FIG. 23 illustrates, in comparison with a known configuration, a known configuration in which RDL (IF latch circuit) is abolished, as well as comparative examples including Example 2 in which G2B (code converter) is disposed in parallel and RDL is abolished, Example 3 in which G2B/WKL (temporary latch circuit) is disposed in parallel and RDL is abolished, and Example 4 in which G2B/WKL/FA (full adder) is disposed in parallel and RDL is abolished. As is apparent from the comparative examples, latency involved in clock transfer is 33 in the known configuration, and is 7 in Examples 3 and 4. The latency can thus be reduced approximately to one-fifth.

Figure 24:
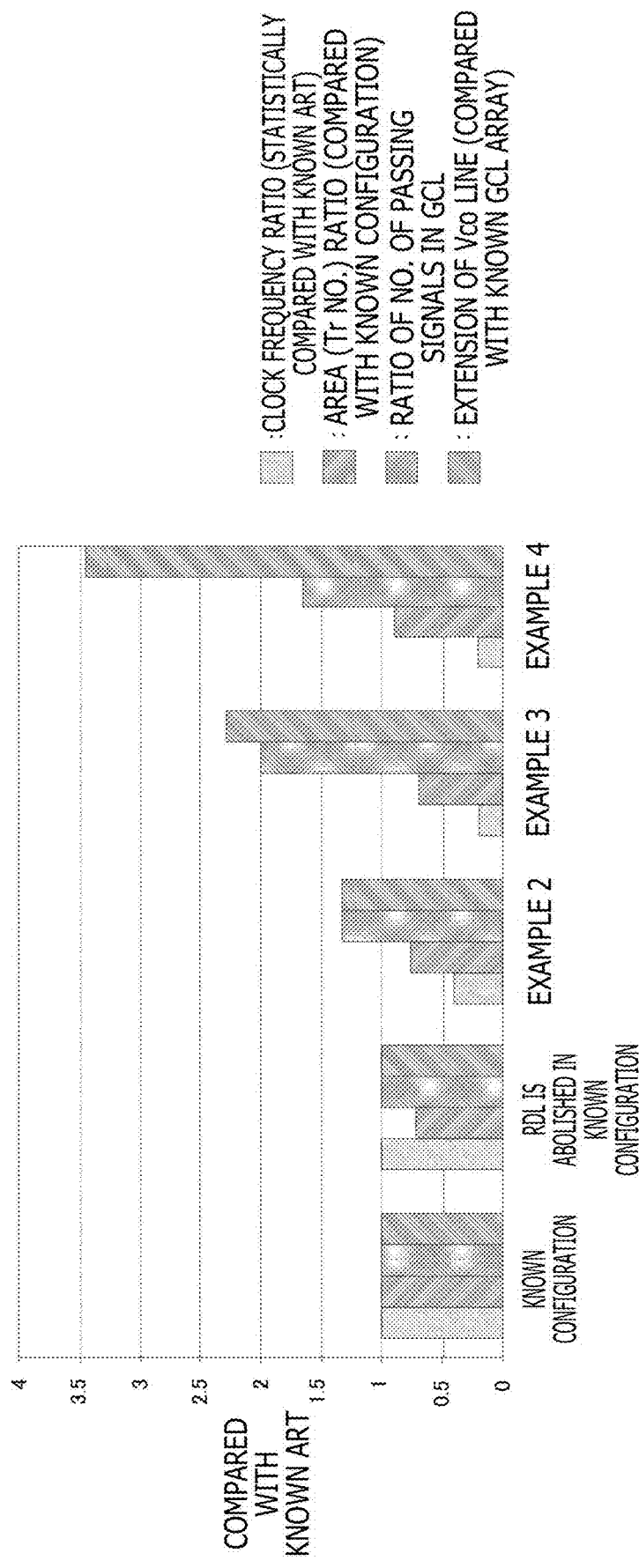
FIG. 24 is a diagram illustrating an example of comparison between the known example and each example of the present technology in terms of each parameter.

FIG. 24 is a diagram illustrating an example in which the known example is compared with each example of the present technology for each parameter. Illustrated here as parameters are a clock frequency ratio (statistically compared with the known example), an area (transistor number) ratio, the ratio of the number of passing signals in the Gray code latch circuit (GCL), and the extension of signal lines for comparison results Vco output from comparators 53_1 to 53_*n* (see FIG. 3) (compared with the known GCL array).

Here, each parameter is specified as 1 for the known configuration, and illustrated are a known configuration in which RDL (IF latch circuit) is abolished, as well as comparative examples including Example 2 in which G2B (code converter) is disposed in parallel and RDL is abolished, Example 3 in which G2B/WKL is disposed in parallel and RDL is abolished, and Example 4 in which G2B/WKL/FA is disposed in parallel and RDL is abolished. As illustrated in FIG. 24, Examples 3 and 4 enable the clock frequency ratio and the area ratio to be reduced approximately to one-seventh, compared to the known configuration.

2-6. Actions and Effects of Embodiment of Present Technology

As described above, the imaging element and the signal processing method for the imaging element in the embodiment of the present technology allow the data transfer, which is serially performed in the known art, to be processed in parallel, thus producing the following actions and effects. That is, the computation processing, which is serially performed in the known art, is executed in parallel, thus enabling a reduction in processing time and in control power. That is, performance can be improved.

Additionally, a reduction of the control circuit for each functional section enables the number of circuits to be reduced, and the cell configuration (unitization) facilitates circuit design. That is, efficiency can be improved. Further, simplified control enables a reduction in the number of design verification items, a corresponding shortened time for design verification allows for a reduction in costs, and the reduced circuit enables a reduction in circuit area and thus in chip cost. That is, cost reduction can be achieved. Furthermore, the reduced circuit enables a reduction in the likelihood of defects, the reduced power consumption allows the life of the imaging element to be extended, and the simplified control enables a reduction in timing errors. That is, quality can be improved.

3. Variation

Note that the above-described embodiment represents an example for embodying the present technology and that each of the matters in the embodiment has a correspondence relation with a respective one of the matters specifying the claimed invention. Similarly, each of the matters specifying the claimed invention has a correspondence relation with a respective one of the matters in the embodiment of the present technology having the same names. However, the present technology is not limited to the embodiment and can be embodied by varying the embodiment without departing from the gist of the invention.

4. Examples of Application to Electronic Equipment

The imaging element and the signal processing method for the imaging element according to the embodiment of the present technology described above can be applied to various types of electronic equipment including an imaging function, such as imaging apparatuses such as a digital still camera and a video camera, portable terminal apparatuses such as a cellular phone which include an imaging function, and a copier using an imaging apparatus in an image reading section.

(Example of Imaging Apparatus)

Figure 25:
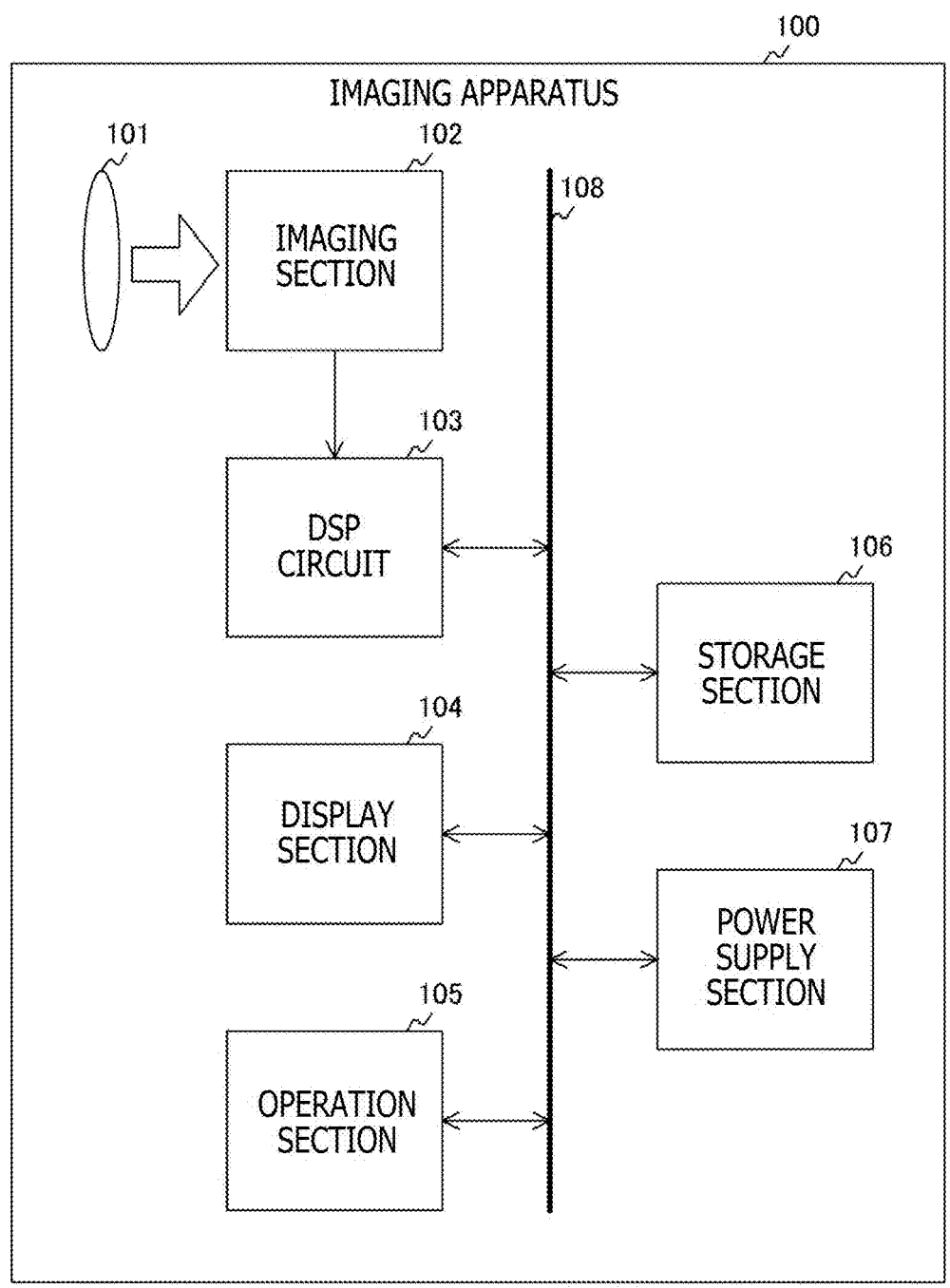
FIG. 25 is a block diagram illustrating a configuration example of an imaging apparatus that is an example of electronic equipment to which the present technology is applied.

FIG. 25 is a block diagram illustrating a configuration example of an imaging apparatus that is an example of the electronic equipment to which the present technology is applied.

An imaging apparatus 100 according to the present applied example is an apparatus that images a subject, and includes an imaging optical system 101 including a lens group and the like, an imaging section 102, a DSP (Digital Signal Processor) circuit 103, a display section 104, an operation section 105, a storage section 106, and a power supply section 107. These are connected to one another by a bus 108. The imaging apparatus 100 is assumed to be, for example, a digital camera such as a digital still camera, a smartphone or a personal computer including an imaging function, an in-vehicle camera, or the like.

The imaging section 102 generates pixel data by photoelectric conversion. The imaging section 102 used is the imaging element according to the embodiment described above. The imaging optical system 101 located on an incident light side of the imaging section 102 focuses and guides light from a subject onto a light receiving surface of the imaging section 102. The imaging section 102 feeds, to the succeeding DSP circuit 103, pixel data generated by photoelectric conversion.

The DSP circuit 103 executes predetermined signal processing on pixel data from the imaging section 102. The display section 104 displays pixel data. The display section 104 is assumed to be, for example, a liquid crystal panel or an organic EL (Electro Luminescence) panel. The operation section 105 generates an operation signal according to an operation performed by a user. The storage section 106 stores various kinds of data such as pixel data. The power supply section 107 feeds power to the imaging section 102, the DSP circuit 103, the display section 104, and the like.

5. Applied Example of Embodiment of Present Technology

Figure 26:
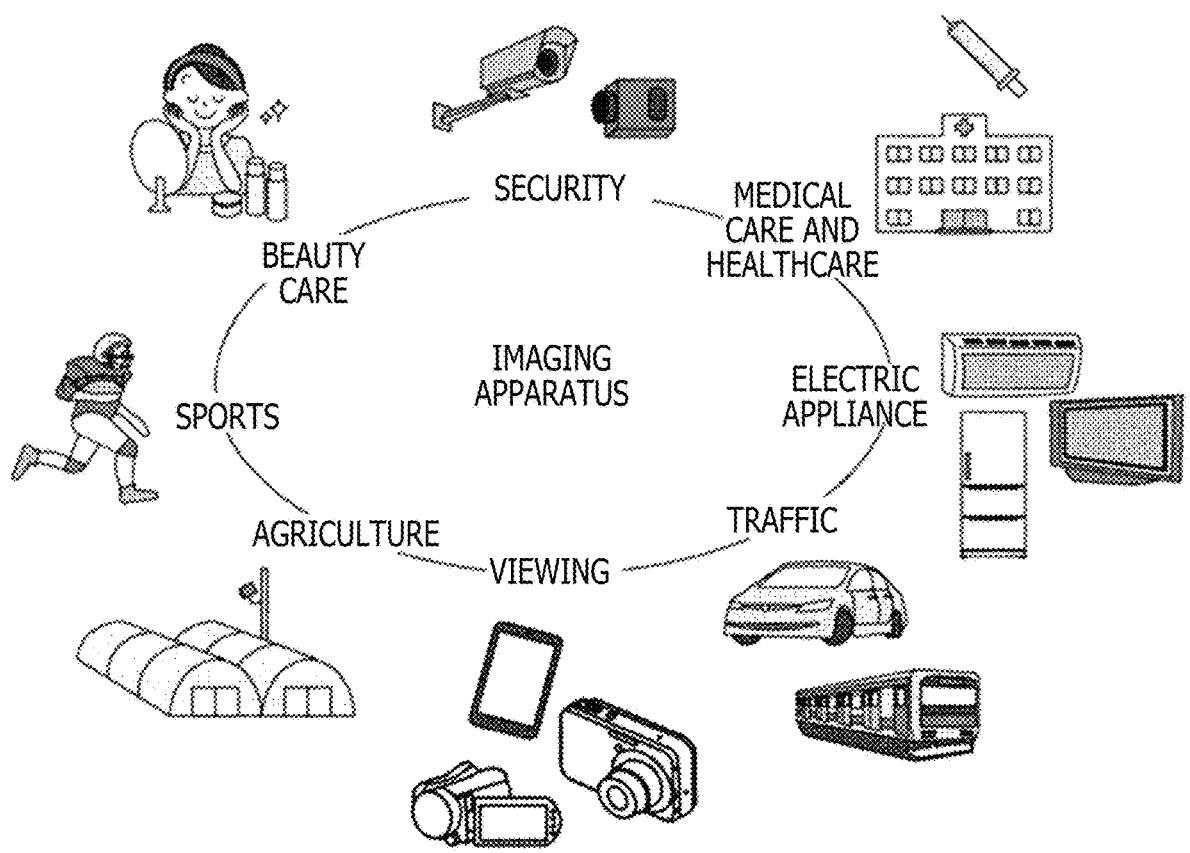
FIG. 26 is a diagram illustrating examples of fields to which the embodiment of the present technology is applied.

The above-described embodiment of the present technology can be applied to various technologies illustrated below. FIG. 26 is a diagram illustrating examples of fields to which the embodiment of the present technology is applied.

The imaging apparatus in the embodiment of the present technology can be used as an apparatus that captures images for viewing, for example, a digital camera, portable equipment with a camera function, or the like.

Additionally, the imaging apparatus can be used as an apparatus used for traffic purposes, such as an in-vehicle sensor that captures images of surroundings of a car, the interior of the car, or the like for safe driving such as automatic stop, recognition of the state of a driver, or the like, a monitoring camera that monitors traveling vehicles and roads, a distance measuring sensor that measures distances such as the distance between vehicles, or the like.

Additionally, the imaging apparatus can be used as an apparatus used for home appliances such as a television, a refrigerator, and an air conditioner to capture images of gestures of the user and to operate equipment according to the gestures.

Additionally, the imaging apparatus can be used as an apparatus for medical or healthcare purposes, such as an endoscope or an apparatus that captures images of blood vessels on the basis of reception of infrared light.

Additionally, the imaging apparatus can be used as an apparatus for security purposes, such as a security camera for crime prevention or a camera for personal authentication.

Additionally, the imaging apparatus can be used as an apparatus for cosmetic purposes, such as a skin view camera that captures images of the skin or a microscope that captures images of the scalp.

Additionally, the imaging apparatus can be used as an apparatus for athletic purposes, such as an action camera or a wearable camera for sports.

Additionally, the imaging apparatus can be used as an apparatus for agricultural purposes, such as a camera for monitoring the conditions of fields and crops.

6. Configurations that can be Taken by Present Technology

Note that the present technology can also take the following configurations.

(1)
An imaging element including:
a pixel array section having disposed therein multiple pixels each including a photoelectric converting section; and
an analog-to-digital converting section configured to convert an analog pixel signal read out from the pixels into a digital pixel signal, in which
the analog-to-digital converting section includes
a Gray code latch circuit configured to latch a Gray code corresponding to the analog pixel signal read out from the pixels,
a code converter configured to code-convert, into a binary code, the Gray code latched in the Gray code latch circuit,
a temporary latch circuit configured to temporarily latch a predetermined binary code, and
an arithmetic section configured to determine a difference between a binary code for the same bit resulting from code-conversion by the code converter and the predetermined binary code latched in the temporary latch circuit, and
data transfer between the Gray code latch circuit and the code converter is processed in parallel a predetermined number of bits at a time, and an output from the code converter is transferred to the arithmetic section through data lines the number of which corresponds to the predetermined number of bits.

(2)
The imaging element according to (1) above, in which the code converter is disposed in parallel with the Gray code latch circuit for each bit.

(3)
The imaging element according to (2) above, in which the code converter is disposed in parallel on a least significant bit side of the Gray code latch circuit when a signal is sent to the code converter from a most significant bit side.

(4)
The imaging element according to (3) above, in which the Gray code latch circuit and the code converter are configured as a cell for each bit.

(5)
The imaging element according to (1) above, in which, further, data transfer between the code converter and the temporary latch circuit is processed in parallel a predetermined number of bits at a time, the output from the code converter is transferred to the arithmetic section through first data lines the number of which corresponds to the predetermined number of bits, and an output from the temporary latch circuit is transferred to the arithmetic section through second data lines the number of which corresponds to the predetermined number of bits.

(6)
The imaging element according to (5) above, in which the temporary latch circuit is disposed in parallel with the code converter disposed in parallel on a least significant bit side of the Gray code latch circuit for each bit.

(7)
The imaging element according to (5) above, in which the Gray code latch circuit, the code converter, and the temporary latch circuit are configured as a cell for each bit.

(8)
The imaging element according to (5) above, in which, further, data transfer between the temporary latch circuit and the arithmetic section is processed in parallel a predetermined number of bits at a time, and an output from the arithmetic section is output to outside through data lines the number of which corresponds to the predetermined number of bits.

(9)
The imaging element according to (8) above, in which, for each bit, the arithmetic section is disposed in juxtaposition with the temporary latch circuit and in parallel with the code converter disposed in parallel on a least significant bit side of the Gray code latch circuit.

(10)
The imaging element according to (9) above, in which the Gray code latch circuit, the code converter, the temporary latch circuit, and the arithmetic section are configured as a cell for each bit.

(11)
A signal processing method for an imaging element including
a pixel array section having disposed therein multiple pixels each including a photoelectric converting section, and
an analog-to-digital converting section configured to convert an analog pixel signal read out from the pixels into a digital pixel signal,
the analog-to-digital converting section including
a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between the binary code for the same bit resulting from code-conversion by the code converter and the predetermined binary code latched in the temporary latch circuit, in which data transfer between the Gray code latch circuit and the code converter is processed in parallel a predetermined number of bits at a time, and an output from the code converter is transferred to the arithmetic section through data lines the number of which corresponds to the predetermined number of bits.

(12)

The signal processing method for the imaging element according to (11) above, in which, further, data transfer between the code converter and the temporary latch circuit is processed in parallel a predetermined number of bits at a time, the output from the code converter is transferred to the arithmetic section through first data lines the number of which corresponds to the predetermined number of bits, and an output from the temporary latch circuit is transferred to the arithmetic section through second data lines the number of which corresponds to the predetermined number of bits.

(13)

The signal processing method according to (12) above, in which, further, data transfer between the temporary latch circuit and the arithmetic section is processed in parallel.

(14)

Electronic equipment including:

an imaging element including a pixel array section having disposed therein multiple pixels each including a photoelectric converting section, and an analog-to-digital converting section configured to convert an analog pixel signal read out from the pixels into a digital pixel signal, the analog-to-digital converting section including a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between the binary code for the same bit resulting from code-conversion by the code converter and the predetermined binary code latched in the temporary latch circuit, in which data transfer between the Gray code latch circuit and the code converter is processed in parallel a predetermined number of bits at a time, and an output from the code converter is transferred to the arithmetic section through data lines the number of which corresponds to the predetermined number of bits.

(15)

The electronic equipment according to (14) above, in which, further, data transfer between the code converter and the temporary latch circuit is processed in parallel a predetermined number of bits at a time, and an output from the arithmetic section is output to outside through data lines the number of which corresponds to the predetermined number of bits.

(16)

The electronic equipment according to (15) above, in which, further, the data transfer between the temporary latch circuit and the arithmetic section is processed in parallel a predetermined number of bits at a time, and the output from the arithmetic section is output to outside through data lines the number of which corresponds to the predetermined number of bits.

REFERENCE SIGNS LIST

10: Imaging element
11: Pixel array section
12: Vertical scanning section
13: Column processing section
14: Horizontal scanning section
15: Digital signal computing section
16: Timing control section
20: Pixel (pixel circuit)
50: Analog-to-digital converting section
51_1 to 51_$n$: Single-slope analog-to-digital converting circuit
52: Gray code generator
53_1 to 53_$n$: Comparator
54 (54_1 to 54_$n$): Column counter
60: Reference signal generator
541 (541_1 to 541_$n$): Gray code latch circuit
542 (542_1 to 542_$n$): Code converter
543 (543_1 to 543_$n$): Full adder
544 (544_1 to 544_$n$): Temporary latch circuit
545: IF (interface) latch circuit

The invention claimed is:

1. An imaging element comprising:

a pixel array section having disposed therein multiple pixels each including a photoelectric converting section; and an analog-to-digital converting section configured to convert an analog pixel signal read out from the pixels into a digital pixel signal, wherein the analog-to-digital converting section includes a Gray code latch circuit configured to latch a Gray code corresponding to the analog pixel signal read out from the pixels, a code converter configured to code-convert, into a binary code, the Gray code latched in the Gray code latch circuit, a temporary latch circuit configured to temporarily latch a predetermined binary code, and an arithmetic section configured to determine a difference between a binary code for a same bit resulting from code-conversion by the code converter and the predetermined binary code latched in the temporary latch circuit, and data transfer between the Gray code latch circuit and the code converter is processed in parallel a predetermined number of bits at a time, and an output from the code converter is transferred to the arithmetic section through data lines the number of which corresponds to the predetermined number of bits.

2. The imaging element according to claim 1, wherein the code converter is disposed in parallel with the Gray code latch circuit for each bit.

3. The imaging element according to claim 2, wherein the code converter is disposed in parallel on a least significant bit side of the Gray code latch circuit when a signal is sent to the code converter from a most significant bit side.

4. The imaging element according to claim 3, wherein the Gray code latch circuit and the code converter are configured as a cell for each bit.

5. The imaging element according to claim 1, wherein, further, data transfer between the code converter and the temporary latch circuit is processed in parallel a predetermined number of bits at a time, the output from the code converter is transferred to the arithmetic section through first data lines the number of which corresponds to the predetermined number of bits, and an output from the temporary latch circuit is transferred to the arithmetic section through second data lines the number of which corresponds to the predetermined number of bits.

6. The imaging element according to claim 5, wherein the temporary latch circuit is disposed in parallel with the code converter disposed in parallel on a least significant bit side of the Gray code latch circuit for each bit.

7. The imaging element according to claim 6, wherein the Gray code latch circuit, the code converter, and the temporary latch circuit are configured as a cell for each bit.

8. The imaging element according to claim 5, wherein, further, data transfer between the temporary latch circuit and the arithmetic section is processed in parallel a predetermined number of bits at a time, and an output from the arithmetic section is output to outside through data lines the number of which corresponds to the predetermined number of bits.

9. The imaging element according to claim 8, wherein, for each bit, the arithmetic section is disposed in juxtaposition with the temporary latch circuit and in parallel with the code converter disposed in parallel on a least significant bit side of the Gray code latch circuit.

10. The imaging element according to claim 9, wherein the Gray code latch circuit, the code converter, the temporary latch circuit, and the arithmetic section are configured as a cell for each bit.

11. A signal processing method for an imaging element including
a pixel array section having disposed therein multiple pixels each including a photoelectric converting section, and
an analog-to-digital converting section configured to convert an analog pixel signal read out from the pixels into a digital pixel signal,
the analog-to-digital converting section including
a Gray code latch circuit configured to latch a Gray code corresponding to the analog pixel signal read out from the pixels,
a code converter configured to code-convert, into a binary code, the Gray code latched in the Gray code latch circuit,
a temporary latch circuit configured to temporarily latch a predetermined binary code, and
an arithmetic section configured to determine a difference between the binary code for a same bit resulting from code-conversion by the code converter and the predetermined binary code latched in the temporary latch circuit, wherein
data transfer between the Gray code latch circuit and the code converter is processed in parallel a predetermined number of bits at a time, and an output from the code converter is transferred to the arithmetic section through data lines the number of which corresponds to the predetermined number of bits.

12. The signal processing method for the imaging element according to claim 11, wherein,
further, data transfer between the code converter and the temporary latch circuit is processed in parallel a predetermined number of bits at a time, the output from the code converter is transferred to the arithmetic section through first data lines the number of which corresponds to the predetermined number of bits, and an output from the temporary latch circuit is transferred to the arithmetic section through second data lines the number of which corresponds to the predetermined number of bits.

13. The signal processing method for the imaging element according to claim 12, wherein,
further, data transfer between the temporary latch circuit and the arithmetic section is processed in parallel a predetermined number of bits at a time, and an output from the arithmetic section is output to outside through data lines the number of which corresponds to the predetermined number of bits.

14. Electronic equipment comprising:
an imaging element including
a pixel array section having disposed therein multiple pixels each including a photoelectric converting section, and
an analog-to-digital converting section configured to convert an analog pixel signal read out from the pixels into a digital pixel signal,
the analog-to-digital converting section including
a Gray code latch circuit configured to latch a Gray code corresponding to the analog pixel signal read out from the pixels,
a code converter configured to code-convert, into a binary code, the Gray code latched in the Gray code latch circuit,
a temporary latch circuit configured to temporarily latch a predetermined binary code, and
an arithmetic section configured to determine a difference between the binary code for a same bit resulting from code-conversion by the code converter and the predetermined binary code latched in the temporary latch circuit, wherein
data transfer between the Gray code latch circuit and the code converter is processed in parallel a predetermined number of bits at a time, and an output from the code converter is transferred to the arithmetic section through data lines the number of which corresponds to the predetermined number of bits.

15. The electronic equipment according to claim 14, wherein,
further, data transfer between the code converter and the temporary latch circuit is processed in parallel a predetermined number of bits at a time, and an output from the arithmetic section is output to outside through data lines the number of which corresponds to the predetermined number of bits.

16. The electronic equipment according to claim 15, wherein,
further, the data transfer between the temporary latch circuit and the arithmetic section is processed in parallel a predetermined number of bits at a time, and the output from the arithmetic section is output to outside through data lines the number of which corresponds to the predetermined number of bits.

* * * * *